(12) United States Patent
Ishihara et al.

(10) Patent No.: US 9,574,327 B2
(45) Date of Patent: Feb. 21, 2017

(54) HYBRID CONSTRUCTION MACHINERY

(71) Applicant: Hitachi Construction Machinery Co., Ltd., Bunkyo-ku, Tokyo (JP)

(72) Inventors: Shinji Ishihara, Ibaraki (JP); Masatoshi Hoshino, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/916,508

(22) PCT Filed: Nov. 13, 2014

(86) PCT No.: PCT/JP2014/080108
§ 371 (c)(1),
(2) Date: Mar. 3, 2016

(87) PCT Pub. No.: WO2015/114908
PCT Pub. Date: Aug. 6, 2015

(65) Prior Publication Data
US 2016/0215479 A1 Jul. 28, 2016

(30) Foreign Application Priority Data
Feb. 3, 2014 (JP) ................. 2014-018639

(51) Int. Cl.
*E02F 9/20* (2006.01)
*B60K 6/485* (2007.10)
(Continued)

(52) U.S. Cl.
CPC .............. *E02F 9/2075* (2013.01); *B60K 6/485* (2013.01); *B60L 1/003* (2013.01); *B60L 11/02* (2013.01);
(Continued)

(58) Field of Classification Search
CPC .......... B60K 6/485; B60L 1/003; B60L 11/02; B60L 11/1862; B60L 15/2045; B60L 2200/40; B60L 2240/36; B60L 2240/421; B60L 2240/423; B60L 2240/443; B60L 2240/545; B60L 2240/662; B60W 10/06; B60W 10/08; B60W 20/00; E02F 3/32; E02F 9/2232; E02F 9/2296; Y02T 10/645; Y02T 10/70; Y02T 10/7005; Y02T 10/7044; Y02T 10/705; Y02T 10/7077; Y02T 10/72; Y02T 10/7283; Y02T 10/7291; Y02T 90/16; Y02T 90/34; Y10S 903/903
See application file for complete search history.

(56) References Cited

U.S. PATENT DOCUMENTS

2007/0187180 A1  8/2007  Kagoshima et al.
2007/0227792 A1  10/2007  Yonemori et al.

FOREIGN PATENT DOCUMENTS

JP  2003-27985 A  1/2003
JP  2005-210874 A  8/2005
(Continued)

OTHER PUBLICATIONS

International Search Report (PCT/ISA/210) issued in PCT Application No. PCT/JP2014/080108 dated Jan. 27, 2015 with English translation (three pages).
(Continued)

*Primary Examiner* — Michael D Lang
(74) *Attorney, Agent, or Firm* — Crowell & Moring LLP

(57) ABSTRACT

The purpose of the present invention is to operate an engine in a proper operation state while keeping the remaining amount in an electrical storage apparatus within a proper range. Hybrid construction machinery according to the present invention is provided with a controller for controlling an engine according to a governor characteristic having a
(Continued)

predetermined inclination that defines a relationship between load torque and rotational speed so that the rotational speed decreases with an increase in the load torque. In the controller, a target engine power calculating unit (2-5) calculates a first target engine power that increases and decreases according to increases and decreases in output values of a load power calculating unit (2-1) and a charge/discharge request calculating unit (2-3), and a target rotational speed calculating unit (2-6) calculates, as a command value for a target rotational speed of a motor generator, a rotational speed at the intersection point of a governor characteristic line changed by a governor characteristic changing unit (2-4) and an equal power line dependent on the first target engine power on a rotating speed-torque characteristic line diagram.

7 Claims, 14 Drawing Sheets

(51) Int. Cl.

| | | |
|---|---|---|
| *B60L 11/02* | (2006.01) | |
| *B60W 10/06* | (2006.01) | |
| *B60W 10/08* | (2006.01) | |
| *B60W 20/00* | (2016.01) | |
| *E02F 9/22* | (2006.01) | |
| *B60L 1/00* | (2006.01) | |
| *B60L 11/18* | (2006.01) | |
| *B60L 15/20* | (2006.01) | |
| *E02F 3/32* | (2006.01) | |

(52) U.S. Cl.
CPC ........ *B60L 11/1862* (2013.01); *B60L 15/2045* (2013.01); *B60W 10/06* (2013.01); *B60W 10/08* (2013.01); *B60W 20/00* (2013.01); *E02F 3/32* (2013.01); *E02F 9/2232* (2013.01); *E02F 9/2296* (2013.01); *B60L 2200/40* (2013.01); *B60L 2240/36* (2013.01); *B60L 2240/421* (2013.01); *B60L 2240/423* (2013.01); *B60L 2240/443* (2013.01); *B60L 2240/545* (2013.01); *B60L 2240/662* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7283* (2013.01); *Y02T 10/7291* (2013.01); *Y02T 90/16* (2013.01); *Y02T 90/34* (2013.01); *Y10S 903/903* (2013.01)

(56) References Cited

FOREIGN PATENT DOCUMENTS

| | | |
|---|---|---|
| JP | 2007-269207 A | 10/2007 |
| JP | 4725406 B2 | 7/2011 |

OTHER PUBLICATIONS

Japanese-language Written Opinion (PCT/ISA/237) issued in PCT Application No. PCT/JP2014/080108 dated Jan. 27, 2015 (four pages).

HYBRID CONSTRUCTION MACHINERY

TECHNICAL FIELD

The present invention relates to hybrid construction machinery that includes, as a power source, an engine and a motor generator that is mechanically connected to the engine and assists the power of the engine.

BACKGROUND ART

With an aim of saving energy (reducing fuel consumption) and reducing the amount of the exhaust gas (carbon dioxide, nitrogen oxide, particulate matter, and the like) which is discharged from the engine and becomes a cause of the environmental load, hybrid construction machinery is publicly known which includes a motor generator in addition to an engine as a power source. In order to save energy and to reduce the amount of the exhaust gas that becomes a cause of the environmental load, it is particularly important to operate an engine at a proper operating condition. In hybrid construction machinery, the engine can be operated under a proper operation state by controlling two power sources of the engine and the motor generator so that the power required for a work is properly distributed to hydraulic pumps.

With respect to a method of properly distributing the power of the engine and the motor generator, technologies shown in Patent Literature 1 and Patent Literature 2 are publicly known. In Patent Literature 1, the pump requiring power that is the power required for a hydraulic pump and the engine maximum power that corresponds to the target rotational speed of the engine determined based on the accelerator signal are compared to each other, and excess or deficiency of the engine maximum power relative to the pump requiring power is calculated as the motor generator power. Further, by correcting the motor generator power according to the deviation relative to the engine speed caused by the difference between the calculation value and the actual value of the pump requiring power, power distribution between the engine and the motor generator is achieved.

Further, in Patent Literature 2, a method is shown which determines the power distribution between the engine and the motor generator based on the actuator requiring power which is the power required by the actuator, the charging power according to the charging amount set in the direction of keeping the charging amount of the electrical storage apparatus within a constant range, and the engine power set according to the generating power and the charging amount of the electrical storage apparatus.

CITATION LIST

Patent Literature

Patent Literature 1: Japanese Patent No. 4725406
Patent Literature 2: U.S. Patent Application Publication No. 2007/0187180

SUMMARY OF INVENTION

Technical Problem

The power distribution method in Patent Literature 1 described above is configured to drive the engine with the engine maximum power corresponding to the target engine speed determined based on the accelerator signal and to bear the access and deficiency of the engine power relative to the pump requiring power as the powering/regeneration power in the motor generator. In other words, the engine comes to continuously operate always at the maximum power corresponding to the accelerator signal. Therefore, the engine comes to continuously inject fuel always at the maximum. This is hardly regarded as a proper operation state from the viewpoint of energy saving.

Also, in the hybrid construction machinery of Patent Literature 1, the charging amount of the electrical storage apparatus feeding/receiving power to/from the motor generator is not monitored. Therefore, when a state the pump requiring power is less (light work) continues, the excess portion of the engine maximum power is utilized by the motor generator as the regenerative power, and the electrical storage apparatus comes to be overcharged. In contrast, when a state the pump requiring power is much (heavy work) continues, the deficiency portion of the engine maximum power is utilized by the motor generator as the regenerative power, and the electrical storage apparatus comes to be overdischarged.

According to the technology of Patent Literature 2, the power distribution in which the charging amount of the electrical storage apparatus is monitored is executed. However, because the power of the engine is changed according to the charging amount of the electrical storage apparatus in this technology, the technology of Patent Literature 1 in which the engine is continuously operated at the maximum power cannot be combined directly with the technology of Patent Literature 2.

Further, according to Patent Literature 1, 2, when the power distribution based on the estimation of the pump requiring power or the actuator requiring power is to be executed, the motor generator is controlled by the power (torque). However, according to this configuration, when it is hard to know the true value of the requiring power, following problems possibly occur.

In FIG. 16 ($a$), a case is assumed in which the required power is erroneously calculated as 40 kW to the less side although the actual requiring power (pump, actuator) of 50 kW is loaded when the engine is operated at the rotation speed Na with the maximum power of 60 kW. According to the calculation of Patent Literature 1 or 2, the power of the motor generator is calculated so as to execute regeneration of 20 kW portion to eliminate the excess and deficiency of the engine power: 60 kW and the requiring power (calculated value): 40 kW. As a result, the engine comes to be loaded with the total: 70 kW of the required power (true value): 50 kW and the regenerated power of the motor generator: 20 kW.

In general, when the calculated value described above is instructed, the engine comes to be an overload state by 10 kW portion immediately because the output response of the motor generator is quick compared to that of the engine. As a result, after a constant time elapses, the engine speed reduces to Nb as shown in FIG. 16($b$), and the maximum power of the engine also reduces according to it. Thus, when the power of the motor generator is calculated based on an erroneous estimate value of the requiring power, unintentional drop of the engine speed possibly occurs. Also, when the state described above continues, the engine speed further drops, and engine stall occurs eventually.

According to Patent Literature 1, in order to avoid the state described above, it is intended to correct the power of the motor generator by calculating the correction power according to the deviation between the target rotation speed and the actual rotation speed, however, the engine cannot be operated with the desired power (maximum engine power at the rotational speed Na) as shown in FIG. 16(b) during the period.

Further, according to the second invention of Patent Literature 1, because the pump power is also corrected, there is a risk that the workability is not secured. Further, in the hybrid construction machinery, it is common that the engine is made compact to save energy and the engine torque is lowered compared to the construction machinery of prior arts. Therefore, when the problem described above occurs, there is also a possibility that the engine stall occurs while the rotational speed drops to Nb.

The present invention has been achieved in view of the problems described above, and the object of it is to provide hybrid construction machinery capable of operating the engine at a proper operation state while keeping the remaining amount of the electrical storage apparatus at a proper range.

Solution to Problem

In order to achieve the object described above, the hybrid construction machinery related to the present invention is characterized to include an engine, a hydraulic pump that is driven by the engine, a hydraulic working unit that is driven by pressure oil discharged from the hydraulic pump, a motor generator that transmits torque between the engine, an electrical storage apparatus that feeds electric power to the motor generator, and a controller that controls the engine with a governor characteristic in which the relation between load torque and rotational speed has such predetermined inclination that the rotational speed reduces as the load torque increases, in which the controller includes a governor characteristic changing unit that changes setting of the governor characteristic, a load power calculating unit that calculates load power on an engine shaft, an electrical storage remaining amount calculating unit that calculates a remaining amount of the electrical storage apparatus, a charge/discharge request calculating unit that calculates a charge/discharge request required for keeping electric power of the electrical storage apparatus in a proper range based on an output of the electrical storage remaining amount calculating unit, a target engine power calculating unit that calculates target power of the engine, a target rotational speed calculating unit that calculates a target rotational speed command of the motor generator, and a motor generator control unit that controls the motor generator according to a target rotational speed command value calculated by the target rotational speed calculating unit, the target engine power calculating unit calculates first target engine power that increases and decreases according to increase and decrease of an output value from the load power calculating unit and the charge/discharge request calculating unit, and the target rotational speed calculating unit calculates rotational speed of an intersection point of a governor characteristic line changed by the governor characteristic changing unit and an equal power line dependent on the first target engine power on a rotational speed-torque characteristic diagram as a target rotational speed command value of the motor generator.

The present invention can exert an excellent effect of capable of freely controlling the power of the engine by configuring the combination of the engine controlled with the governor characteristic having such predetermined inclination that the rotational speed reduces as the load torque increases (will be hereinafter referred to as "droop characteristic" for the sake of simplification) and the motor generator controlled according to the target rotational speed command. This effect will be explained in detail using FIG. 14. First, the operation of the engine single body having the droop characteristic will be explained according to FIG. 14(a).

With respect to the droop characteristic, it is assumed that the rotational speed at no-load is N0 and the rotational speed at the maximum power is N1. It is characterized that the rotational speed lowers as the load torque increases because the torque of the engine having the droop characteristic is determined on this straight line. For example, the engine speed is regulated so as to become Ne1 when the load to the engine is the load power A and to become Ne2 when the load to the engine is the load power B.

Next, the operation of the case of combining the motor generator controlled according to the target rotational speed command will be explained by FIG. 14(b). When the target rotational speed for the motor generator is given by the rotational speed N* of the intersection point I of the droop characteristic and the equal power line according to the target engine power, the engine mechanically connected to the motor generator comes to operate at N* which is the same rotational speed with that of the motor generator. Then, the engine outputs the torque T* (power P*=T*×N*) that corresponds to the rotational speed N* according to the droop characteristic. At this time, the power difference between the actual load power and the engine power has been automatically eliminated by the rotational speed control of the motor generator.

Also, the motor generator operates so as to immediately eliminate the rotation speed error caused slightly by the load change because the output response of the motor generator is quick with respect to the engine, when the power of the hydraulic pump sharply changes. In other words, the motor generator comes to output the power so as to compensate "power difference after the load change". The engine power can be fixed to P* because the engine speed is kept at N* immediately by the operation described above.

Further, even when the load power of the hydraulic pump power, the engine auxiliary machine power, and the like cannot be known precisely, the motor generator can continuously fix the engine power at P* as far as the target rotational speed N* is commanded, and therefore there is also an advantage against prior arts that robust power control can be achieved.

From the above, it is known in the configuration of the present invention that the engine can be operated actually at the target engine power P* by controlling the target rotational speed N* of the motor generator. Also, "the engine can be kept at the target power" means that the engine is operated at a proper operation state which is close to the steady state. Therefore, because combustion of the engine is stabilized in the steady state, energy saving and suppression of the exhaust gas having an environmental load are achieved.

Further, in the present invention, the target power of the engine is set so as to be increased and decreased according to the output values of the load power calculating unit and the charge/discharge request calculating unit. Thereby, it can be avoided to continuously set the target engine power low immoderately, and therefore the powering frequency by the motor generator is suppressed and the electric power consumption by the electrical storage apparatus is suppressed. Thereby, such state can be avoided that the electrical storage remaining amount becomes insufficient to cause assist incapability and engine stall. In a similar manner, it can be avoided to continuously set the target engine power high, the regeneration frequency by the motor generator is suppressed, and overcharging the electrical storage apparatus is suppressed. In other words, the engine can be operated with a proper operation state while keeping the remaining amount of the electrical storage apparatus within a proper range.

Advantageous Effects of Invention

According to the present invention, the engine can be operated with a proper operation state while keeping the remaining amount of the electrical storage apparatus within a proper range. Further, the problems, configurations and effects other than those described above will be clarified by explanation of the embodiments below.

DESCRIPTION OF EMBODIMENTS

Figure 1:
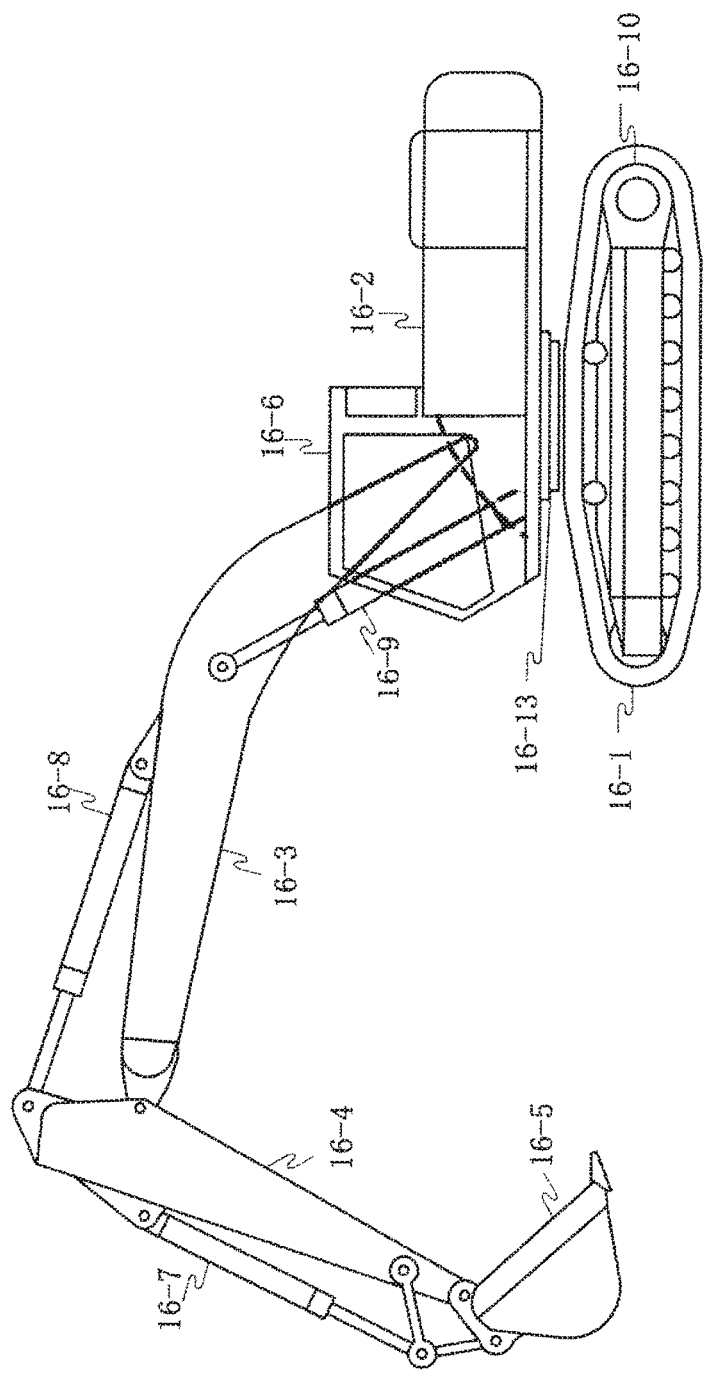
FIG. 1 is a side view of a hybrid excavator related to an embodiment of the present invention.

Embodiments of the present invention will be explained based on the drawings. FIG. 1 is a side view showing the overall configuration of a hybrid excavator which is an embodiment of the present invention. As shown in FIG. 1, the hybrid excavator (hybrid construction machinery) related to the embodiment of the present invention includes a travel base 16-1 and a revolving superstructure 16-2. The travel base 16-1 has a function of making the hybrid excavator travel by the traveling hydraulic motors 16-10, 16-11. Also, the traveling hydraulic motor 16-11 not illustrated is mounted on the vehicle body right side.

The revolving superstructure 16-2 rotates with respect to the travel base 16-1 by a revolving mechanism 16-13, and includes a boom 16-3, an arm 16-4, and a bucket 16-5 which execute the excavating work on the other one side (for example, the right side in facing the front) of the front part of the revolving superstructure 16-2. A front working device is configured of these boom 16-3, arm 16-4, and bucket 16-5. The boom 16-3, the arm 16-4, and the bucket 16-5 are driven by a hydraulic cylinder 16-9, a hydraulic cylinder 16-8, and a hydraulic cylinder 16-7, respectively. Also, the revolving superstructure 16-2 includes a cab 16-6, and the operator rides in the cab 16-6 and operates the hybrid excavator.

Figure 2:
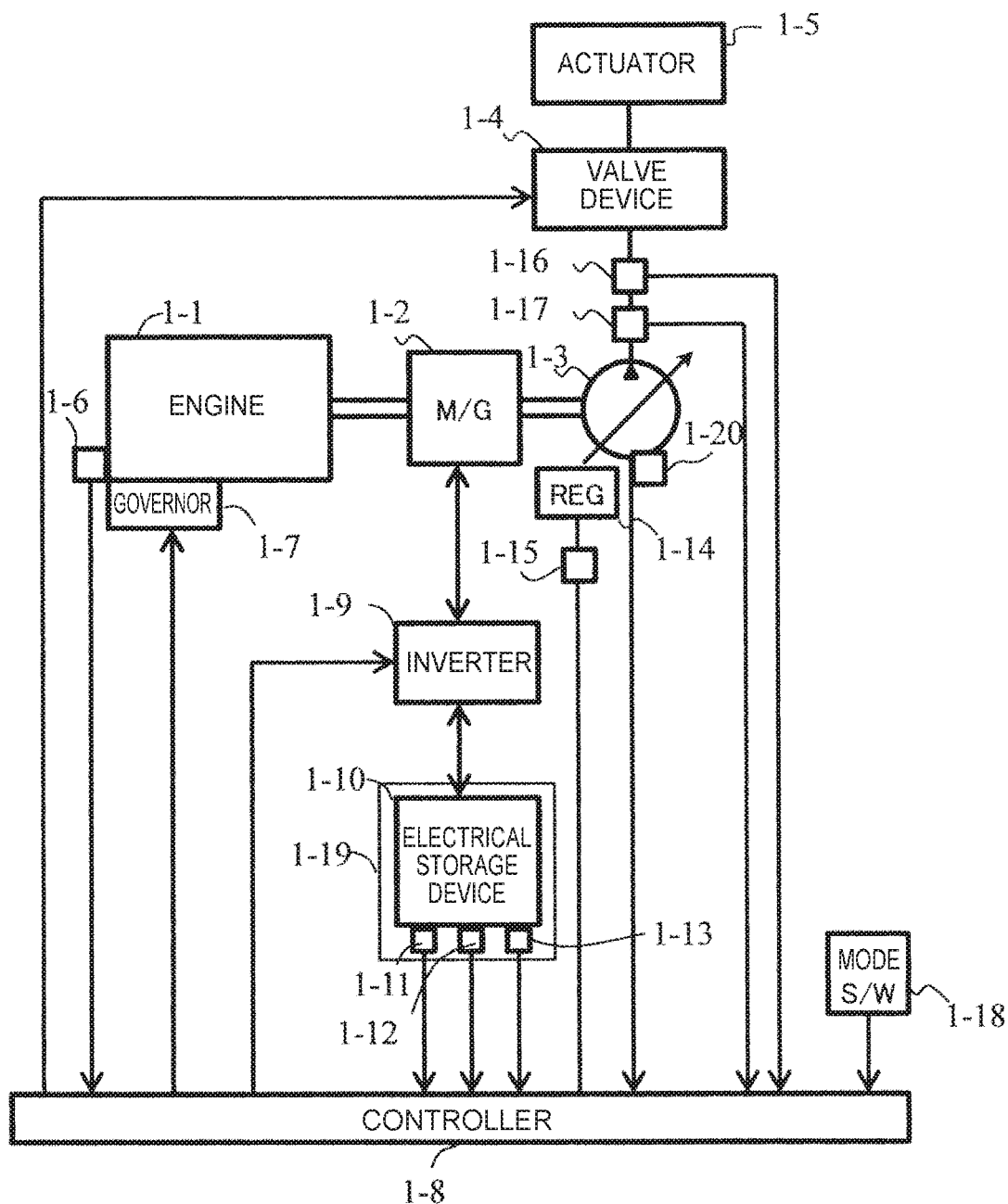
FIG. 2 is a drawing showing a hydraulic drive device of the hybrid excavator shown in FIG. 1.

Next, the hydraulic drive device of the hybrid excavator related to the present embodiment will be explained. FIG. 2 is a drawing showing the overall configuration of the hydraulic drive device of the hybrid excavator related to the present embodiment. As shown in FIG. 2, the hydraulic drive device used in the present embodiment is used for driving the front working device (16-3, 4, 5), the revolving superstructure 16-2, and the travel base 16-1 which are the hydraulic working units of the hybrid excavator, and includes an engine 1-1, a rotational speed sensor 1-6 that detects the engine speed, a governor 1-7 that regulates the fuel injection amount of the engine 1-1, a variable displacement hydraulic pump (hereinafter simply referred to as "hydraulic pump") 1-3 driven by the engine 1-1, a motor generator 1-2 disposed on the engine drive shaft, an electrical storage apparatus 1-19, an inverter 1-9 as a motor generator control unit 2-7 (refer to FIG. 3) that controls the motor generator 1-2 and feeds/receives the electric power to/from the electrical storage apparatus 1-19 according to the necessity, and a controller 1-8 that controls the governor 1-7, regulates the fuel injection amount to control the engine speed, and controls the motor generator 1-2 through the inverter 1-9.

The pressure oil discharged from the hydraulic pump 1-3 is fed to a hydraulic actuator 1-5 (the hydraulic cylinders 16-7, 8, 9, and the like) through a valve device 1-4. Various hydraulic working units of the hybrid excavator are driven by this hydraulic actuator 1-5. Also, the hydraulic pump 1-3 is provided with various sensors such as a discharge pressure sensor 1-16 that measures the pressure of the discharged pressure oil, a flow rate sensor 1-17 that measures the flow rate, an inclination angle sensor 1-20 that measures the pump inclination, and the like, and the pump load can be calculated by the controller 1-8 based on the sensor values of them. This configuration can be utilized for "load power calculating unit" of the present invention.

A regulator 1-14 and a proportional solenoid valve 1-15 are for regulating the volume (displacement volume) of the hydraulic pump 1-3. The regulator 1-14 controls the absorption power of the hydraulic pump 1-3 by operating the inclination angle of the swash plate of the hydraulic pump 1-3. The proportional solenoid valve 1-15 controls the working amount of the regulator 1-14 by the drive signal calculated by the controller 1-8.

The electrical storage apparatus 1-19 is configured of an electrical storage device 1-10 formed of a battery and a capacitor, an electric current sensor 1-11, a voltage sensor 1-12, a temperature sensor 1-13, and the like attached to this electrical storage device 1-10, and the electrical storage amount is managed by the controller 1-8 from the information of the electric current, voltage, temperature, and the like detected by these sensors. The configuration described above is utilized by "electrical storage remaining amount calculating unit" and "electrical storage apparatus managing unit" in the present invention.

Figure 3:
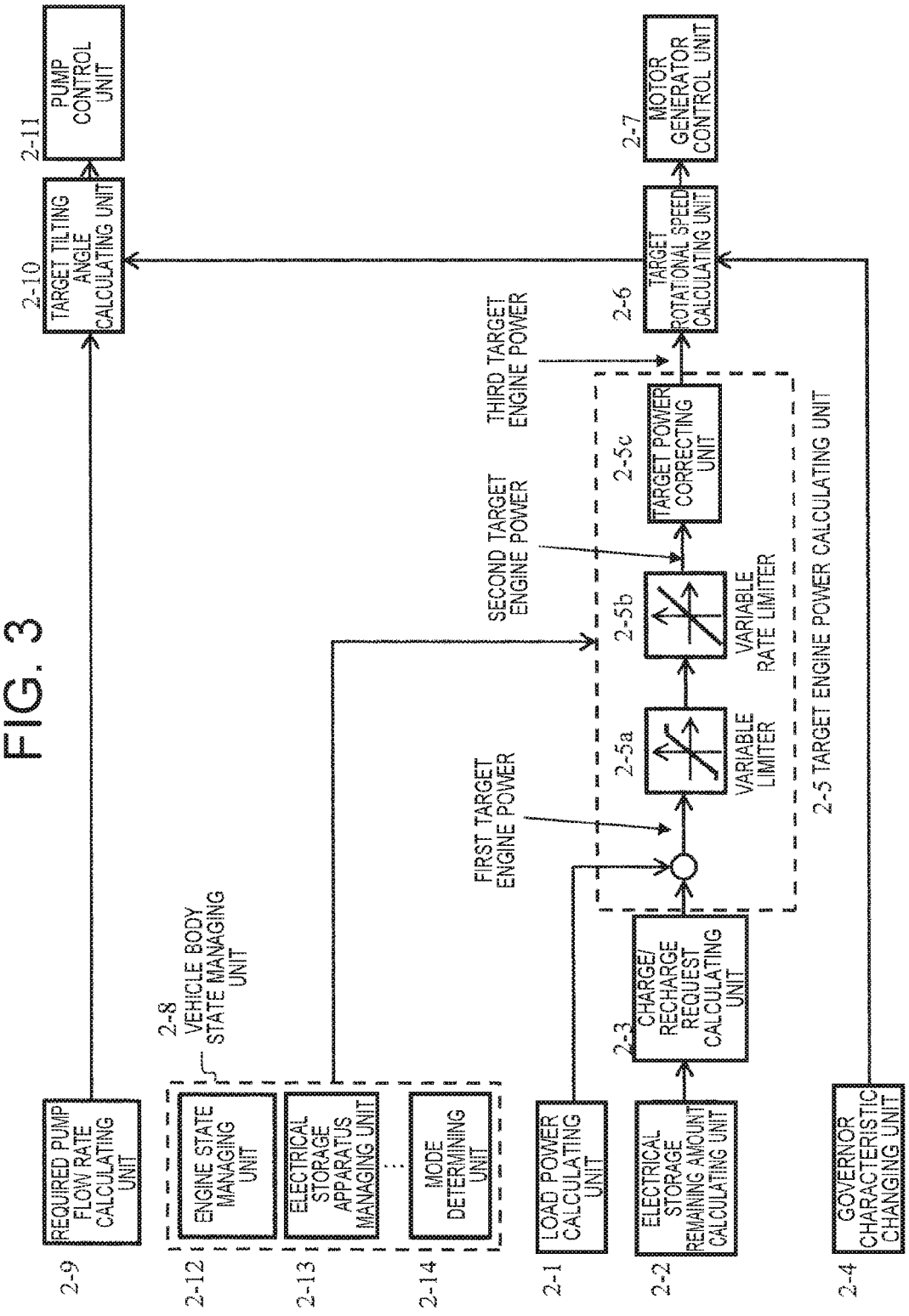
FIG. 3 is a drawing showing the internal configuration of a controller shown in FIG. 2.

Next, the detail of the controller 1-8 will be explained. FIG. 3 is a drawing showing the internal configuration of the controller 1-8. Further, although the engine 1-1, the hydraulic system, various electrical units, and the like are also controlled by the controller 1-8 in some way, these configurations are not illustrated in FIG. 3 because they are not directly related to the present invention.

As shown in FIG. 3, the controller 1-8 exerts a role of, according to the calculation results of a load power calculating unit 2-1, an electrical storage remaining amount calculating unit 2-2, a governor characteristic changing unit 2-4, a vehicle body state managing unit 2-8, and a required pump flow rate calculating unit 2-9, calculating the target tilting angle of the hydraulic pump 1-3 and outputting the same to a pump control unit 2-11, and calculating the target rotational speed command value of the motor generator 1-2 and outputting the same to the motor generator control unit 2-7, respectively.

Figure 4:
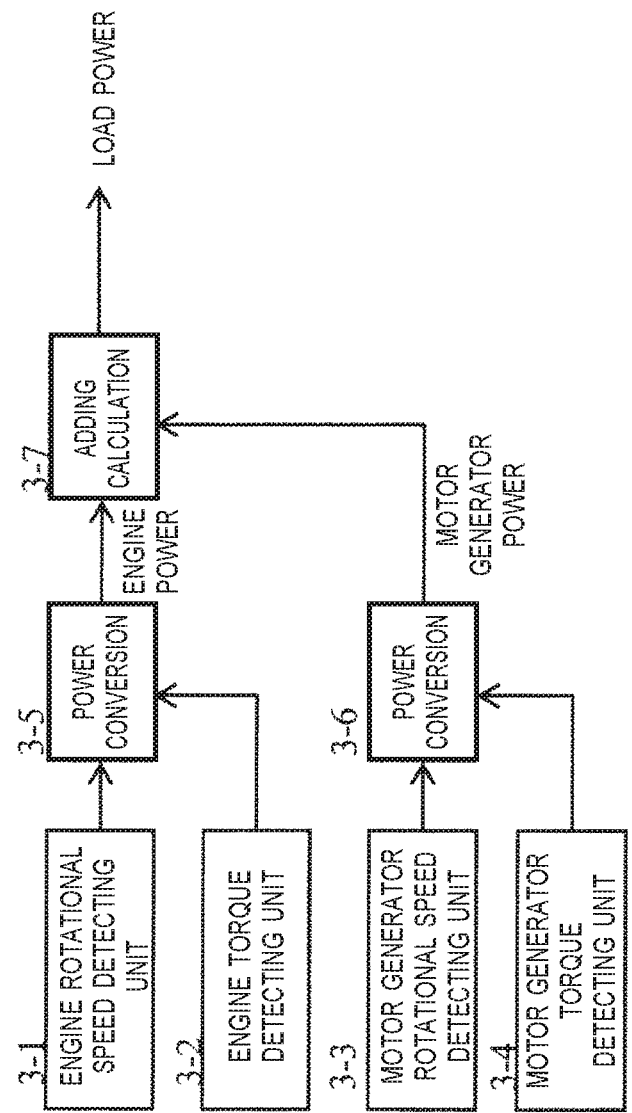
FIG. 4 is a drawing showing the first example of the load power calculating unit shown in FIG. 3.

An example of a method for implementing the load power calculating unit 2-1 is shown in FIG. 4. In FIG. 4, it is configured that the load power is calculated from the sum of the power of the engine 1-1 and the motor generator 1-2. With this configuration, because the axial power of the engine 1-1 is included in the calculation, the load power can be obtained including the load of the auxiliary machine group (air conditioner and the like, for example). Also, feeding/receiving the energy to/from the inertia body (mainly the flywheel) by acceleration/deceleration of the engine can also be taken into consideration. These are hardly taken into consideration when the load power is calculated from the sensor group arranged in the hydraulic pump 1-3.

In the calculation of FIG. 4, the engine power is calculated from the multiplication product of an engine rotational speed detecting unit 3-1 and an engine torque detecting unit 3-2. The engine torque detecting unit 3-2 may directly measure the torque by attaching a torque meter to the engine 1-1, or may calculate the same indirectly from the fuel injection amount and the like. In a similar manner, a motor generator torque detecting unit 3-4 also may use a torque meter, or may employ a method of indirect calculation from the electric current value of the motor generator 1-2 or the inverter 1-9.

With respect to power conversion 3-5, 3-6, although conversion to the power by the multiplication product of the torque and the rotational speed is the fundamental function, such conversion of capable of calculating the load on the engine shaft considering various efficiencies is also included. Lastly, by adding the engine power and the motor generator power obtained by an adding unit 3-7, the load power is estimated.

Figure 5:
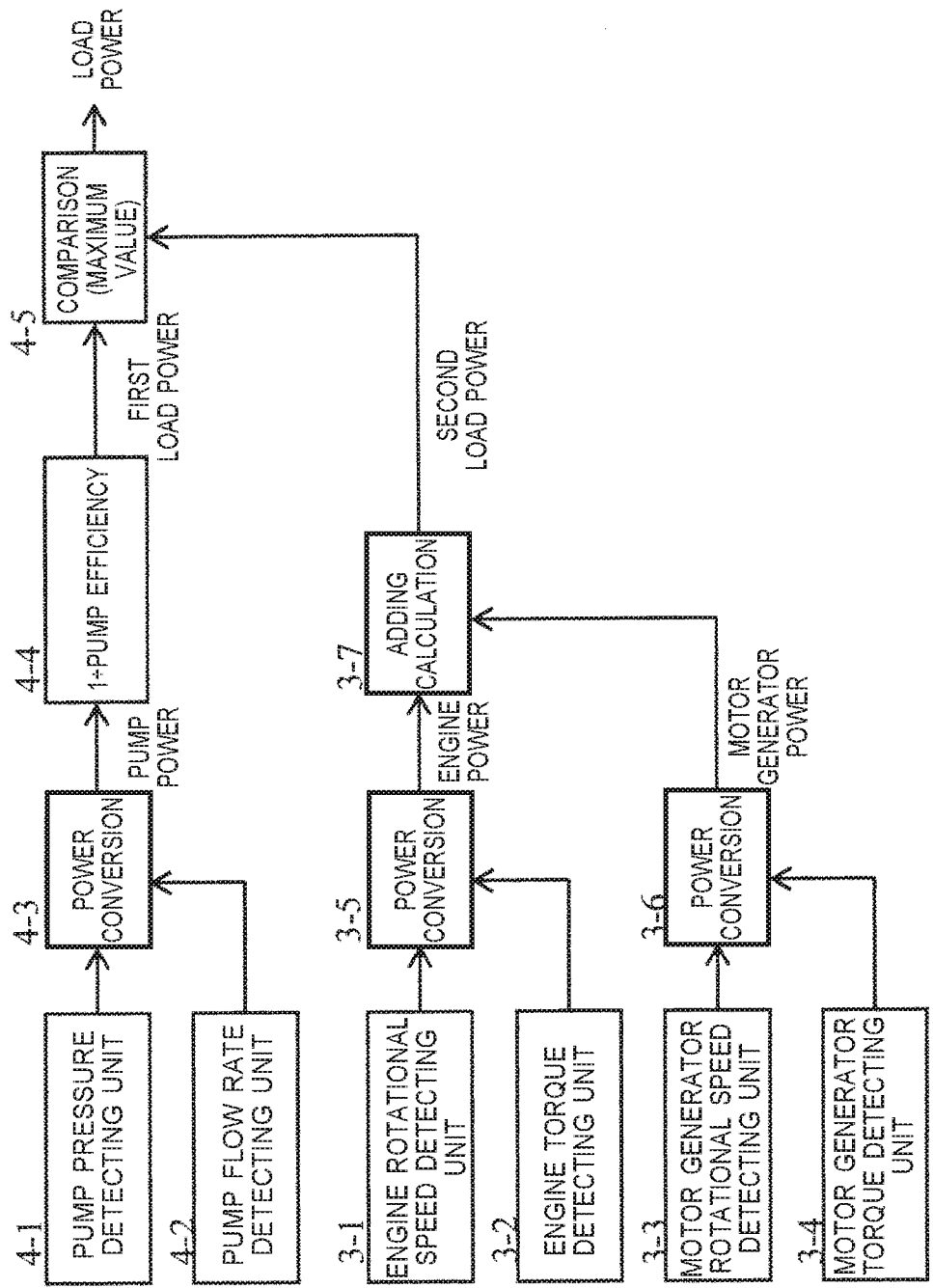
FIG. 5 is a drawing showing the second example of the load power calculating unit shown in FIG. 3.

Also, an example of another method for implementing the load power calculation unit 2-1 is shown in FIG. 5. In this method, in addition to the load power calculating method of FIG. 4, the load power is calculated by obtaining the output of the hydraulic pump 1-3 using a pump pressure detecting unit 4-1 and a pump flow rate detecting unit 4-2.

The pump flow rate detecting unit 4-2 may directly detect the discharging flow rate of the hydraulic pump 1-3 using a flow meter, or may detect the same by a method of indirectly calculating the discharging flow rate based on the control command value of the lever manipulated variable, the pump command pressure, and the like and the tilting angle of the hydraulic pump 1-3. Also, the output value of the required pump flow rate calculating unit 2-9 may be also utilized as it is.

The absorption power of the hydraulic pump 1-3 is calculated by dividing the pump power by a pump efficiency 4-4, the pump power being discharged by the hydraulic pump 1-3 calculated by power conversion 4-3. Thereby, the load power on the engine shaft can be calculated. In FIG. 5, such method is employed that the larger one out of the first load power obtained based on the sensor of the hydraulic pump 1-3 and the second load power obtained from the sum of the power of the engine 1-1 and the motor generator 1-2 is made the final output. By employing this method, because the load is always estimated on the larger side, engine stall caused by power shortage and deterioration of the operation feeling can be avoided.

Returning to FIG. 3, the electrical storage remaining amount calculating unit 2-2 calculates the electrical storage remaining amount of the electrical storage apparatus 1-19 utilizing the values of the electric current sensor 1-11, the voltage sensor 1-12, and the temperature sensor 1-13 attached to the electrical storage device 1-10. A charge/discharge request calculating unit 2-3 calculates the powering/regeneration request to the motor generator 1-2 in order to keep the power of the electrical storage device 1-10 within a proper range. In concrete terms, the powering/regeneration request is calculated so that the electrical storage remaining amount calculated by the electrical storage remaining amount calculating unit 2-2 follows the target electrical storage remaining amount which is internally calculated by the charge/discharge request calculating unit 2-3. This is achieved, for example, by issuing the powering request when the electrical storage remaining amount is more than the target electrical storage remaining amount, whereas by issuing the regeneration request when the electrical storage remaining amount is less than the target electrical storage remaining amount.

Further, the charge/discharge request calculating unit 2-3 also has a function, in hybrid construction machinery provided with a motor generator in addition to the motor generator 1-2 mechanically connected to the engine 1-1, of calculating the powering/regeneration request for the motor generator 1-2 mechanically connected to the engine 1-1 according to the powering/regeneration operation of this motor generator not connected to the engine 1-1.

The governor characteristic changing unit 2-4 exerts the function of changing the droop characteristic utilized for control of the engine 1-1. The required pump flow rate calculating unit 2-9 calculates the discharge flow rate of the hydraulic pump 1-3 required according to the operation of the operator. This can be calculated based on the manipulated variable of the lever, for example.

The vehicle body state managing unit 2-8 is a means for monitoring and managing the state of the overall vehicle body of the construction machinery. In FIG. 3, as the representative ones out of the vehicle body state managing unit 2-8, an engine state managing unit 2-12 that manages the operation state of the engine 1-1, an electrical storage apparatus managing unit 2-13 that manages the operation state of the electrical storage apparatus 1-19, and a mode determining unit 2-14 that determines the operation mode of the vehicle body are shown. The mode determining unit 2-14 determines the operation mode of the vehicle body referring to a mode switch 1-18. Also, the vehicle body state managing unit 2-8 operates also when the control is switched based on the hydraulic oil temperature and the air temperature information such as the external air temperature although it is not illustrated in FIG. 3.

The engine state managing unit 2-12 determines whether or not the engine 1-1 is under an excessive load condition or so on by monitoring the load factor of the engine 1-1, the cooling water temperature, and the like. The electrical storage apparatus managing unit 2-13 has a function of calculating not only the electrical storage remaining amount calculated at each time but also the powering possible amount and the regeneration possible amount of the range where the electrical storage apparatus 1-19 can be utilized under a proper state. For example, when the temperature of the electrical storage device 1-10 becomes high because the charge/discharge operation for the electrical storage device 1-10 lasts for an extremely long time, in order to prevent further temperature rise, such control is executed that the electric current amount is limited by limiting feeding/receiving the electric power to/from the motor generator 1-2 and the heat generating amount is reduced. Thus, the electrical storage apparatus managing unit 2-13 manages the use range of the electrical storage device 1-10 considering the safety of the equipment even when there is an ample electrical storage remaining amount.

Also, when the electrical storage device 1-10 is a lithium ion battery, there is such characteristic that the voltage drops under ultra-low temperature even when the electrical storage device 1-10 has been fully charged, and therefore the powering possible amount is calculated less in the electrical storage apparatus managing unit 2-13. Thus, by calculating the powering possible amount based on the information other than the electrical storage remaining amount, the power that can be fed from the power source formed of the engine 1-1 and the motor generator 1-2 can be properly managed, and therefore the excessive pump absorption power is limited which can serve to prevention of the engine stall. Further, by calculating the powering/regeneration possible amount based on the factors affecting the life of the electrical storage device 1-10 (for example, the temperature, the electric current amount), excessive deterioration of the electrical storage device 1-10 can be also prevented.

A target engine power calculating unit 2-5 exerts the function of calculating the target power output to the engine 1-1. The target engine power calculating unit 2-5 of FIG. 3 calculates the target engine power according to the output of the load power calculation unit 2-1, the charge/discharge request calculating unit 2-3, and the vehicle body state managing unit 2-8.

The calculation content in the target engine power calculating unit 2-5 will be explained in order. Firstly, the first target engine power is calculated by adding the running/regeneration request for the motor generator calculated by the charge/discharge request calculating unit 2-3 to the load on the engine shaft calculated by the load power calculation unit 2-1 which is the sum of the absorption power of the hydraulic pump 1-3, the power required for driving the engine auxiliary machines, and the like.

The first target engine power is calculated according to the calculation formula of "target engine power=load power-motor generator power". For example, when the load power is calculated to be 50 kW by the load power calculating unit 2-1 and the powering request for the motor generator 1-2 calculated by the charge/discharge request calculating unit 2-3 is 30 kW because the electrical storage remaining amount is much, the first target engine power becomes 20 kW. Also, even when the load power is equal, when the electrical storage remaining amount is less and the regeneration request for the motor generator 1-2 is calculated to be 30 kW by the charge/discharge request calculating unit 2-3, the first target engine power becomes 80 kW. Thus, the first target engine power determines the target value of the engine power according to the load power and the electrical storage remaining amount.

Next, the target engine power calculating unit 2-5 calculates the second target engine power in which a restriction is provided to the first target engine power described above using a variable limiter 2-5a and a variable rate limiter 2-5b. The sharp fluctuation of the load power is reflected to the target power as it is because the first target engine power described above is calculated by "engine power=load power-motor generator power". The sharp fluctuation seen in the first target engine power is suppressed, and a smoothed target value is calculated because the second target engine power becomes a signal passing through the rate limiter. Therefore, if the power of the engine 1-1 can follow this second target engine power, the fuel efficiency is improved, and generation of the exhaust gas that imposes a load on the environment is suppressed. Also, because the operation point of the engine 1-1 is stabilized, the noise by vibration and the like can be also suppressed. In particular, the variable rate limiter 2-5b contributes to prevention of generation of the exhaust gas.

The variable limiter 2-5a and the variable rate limiter 2-5b described above are for changing the upper/lower limit value and the increase/decrease rate according to the output of the vehicle body state managing unit 2-8. Hereinafter, an example of the changing method for each will be explained. The variable limiter 2-5a gives a restriction with respect to the upper/lower limit value of the first target engine power. For example, when it is determined by the engine state managing unit 2-12 that continuous operation of the engine 1-1 has been continuing under the heavy-loadstate, the maximum value of the target engine power is limited by lowering the upper limit value of the variable limiter 2-5a, and the load factor of the engine 1-1 is lowered. Even when the engine 1-1 becomes the backup mode (the mode the output of the engine is limited) and the maximum output is limited, similar restriction is executed.

Also, by making the lower limit value of the variable limiter 2-5a high, the engine 1-1 can be intentionally operated with a high output. This function is effective when it is intended to warm up the electrical storage device 1-10 and the hydraulic oil at the time of the start of operation in the cold district and so on.

Figure 6:
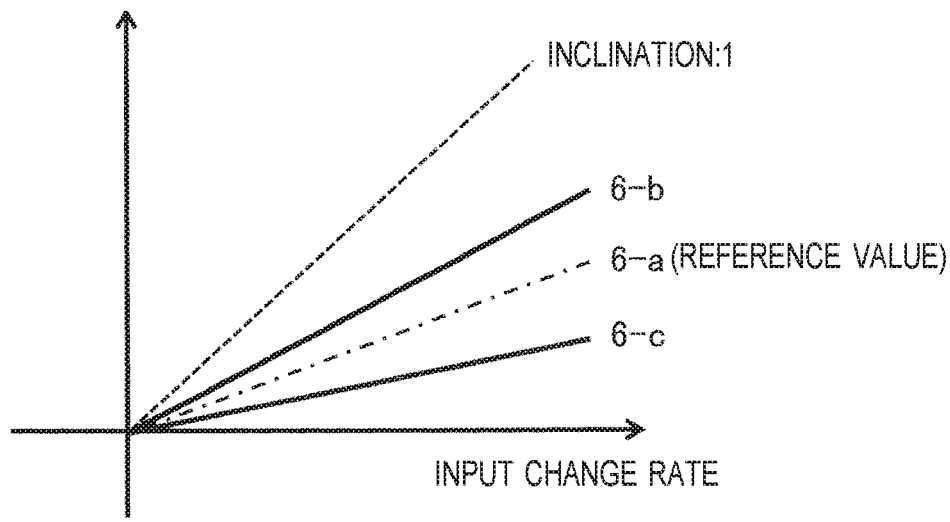
FIG. 6 is a drawing showing the change of the variable rate limiter by mode switch selection.

Next, the effect of the mode determining unit 2-14 on the variable rate limiter 2-5b will be explained according to FIG. 6. FIG. 6 is a drawing showing the change of the variable rate limiter by mode switch selection. As shown in FIG. 6, when the mode switch 1-18 has been set to the power mode, although the effect of the fuel efficiency improvement and suppression of the exhaust gas becomes small, in order to make the power of the engine 1-1 largely fluctuate and to secure the feed power to the hydraulic pump 1-3, the increase rate is made higher (6-b) than the reference value (6-a). On the contrary, when the eco-mode has been set, the increase rate is made lower (6-c) than the reference value. Also, the reduction rate (the change factor is minus) is the requirement related when the pump power reduces and does not affect the operability, and therefore there is no problem even when the reduction rate is determined without depending on switching of the power mode and the eco-mode.

Figure 7:
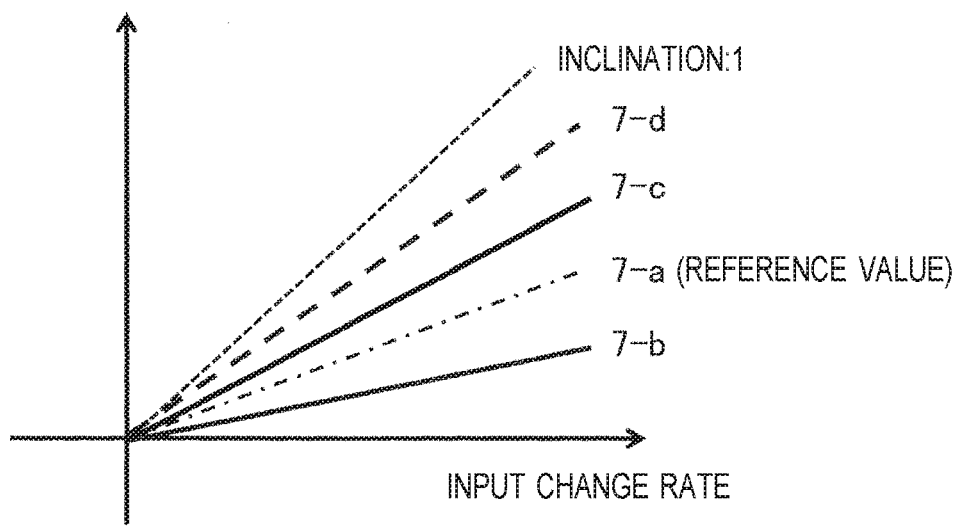
FIG. 7 is a drawing showing the change of the variable rate limiter by powering possible amount.

Next, the effect of the electrical storage apparatus managing unit 2-13 on the variable rate limiter 2-5b will be explained. First, the changing state of the increase rate of the variable rate limiter 2-5b by the powering possible amount calculated by the electrical storage apparatus managing unit 2-13 is shown in FIG. 7. As shown in FIG. 7, the reference value of the increase rate determined by the mode determining unit 2-14 and the like is defined as 7-*a*. When the powering possible amount becomes higher than this state, because the engine assist amount by the motor generator 1-2 can be made large, even when the load power sharply increases, the power of the engine 1-1 can be increased slowly. Therefore, the increase rate of the variable rate limiter 2-5*b* is shifted to the direction of 7-*b*.

On the contrary, when the powering possible amount reduces, because the engine assist amount by the motor generator 1-2 becomes less, the engine stall occurs if the power of the engine 1-1 is increased slowly, and therefore the increase rate comes to be shifted to the direction of higher 7-*c* or 7-*d* so as to positively utilize the engine 1-1 compared to 7-*a* that is the reference. Also, when the powering possible amount is calculated to be 0, because the engine assist cannot be executed, the engine power must be output per the first target engine power, and therefore the increase rate of the variable rate limiter 2-5*b* is to basically select the increase rate of the inclination 1 in FIG. 7.

Figure 8:
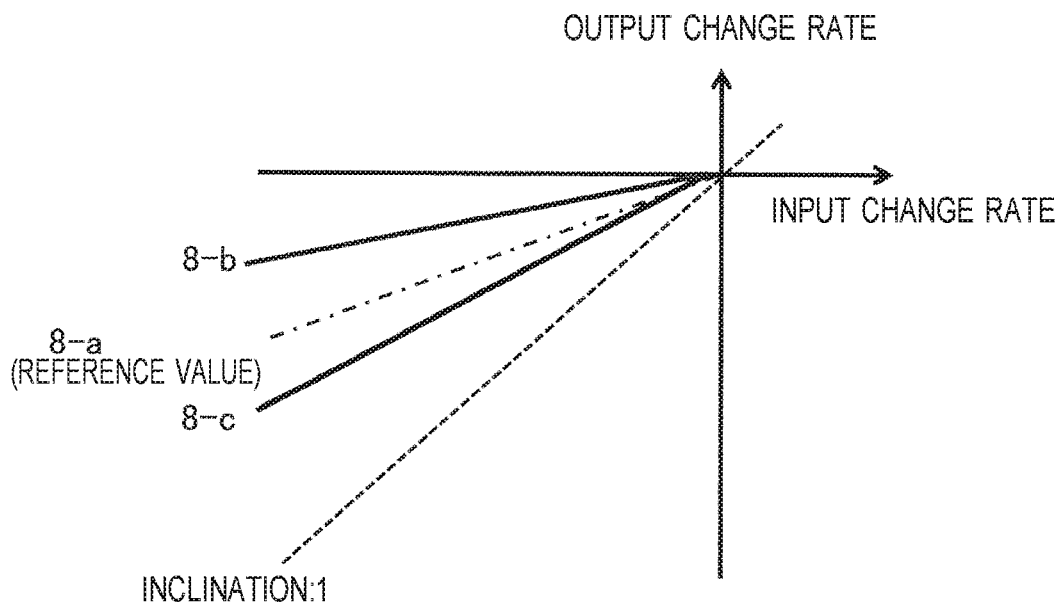
FIG. 8 is a drawing showing the change of the variable rate limiter by the regeneration possible amount.

Next, the changing state of the reduction rate of the variable rate limiter 2-5*b* by the powering possible amount calculated by the electrical storage apparatus managing unit 2-13 is shown in FIG. 8. The reference value of the reduction rate determined by the mode determining unit 2-14 and the like is defined as 8-*a*. When the regeneration possible amount becomes higher than this state, because a load is applied to the engine 1-1 by electric power generation of the motor generator 1-2, even when the load power sharply reduces, the power of the engine 1-1 can be slowly reduced. Therefore, the reduction rate of the variable rate limiter 2-5*b* is shifted to the direction of 8-*b*. On the contrary, when the regeneration possible amount becomes less, because the electric power generation amount by the motor generator 1-2 becomes less, a load can not be applied to the engine 1-1, and therefore the reduction rate is shifted to the direction of higher 8-*c* which is higher than 8-*a* that is the reference.

In the above explanation, in conversion from the first target engine power to the second target engine power, the configuration of using the variable rate limiter 2-5*b* has been explained, however, the method for implementing the present invention is not limited to it. For example, a method of using a low pass filter that can change the time constant and a moving average filter that can change the sample quantity can be utilized as an alternative means, and the second target engine power can be created by a method similar to that in the above explanation.

The operation of a case a target power correcting unit 2-5*c* is used with an aim of improving the fuel efficiency will be explained according to FIG. 9. Also, here, for the sake of simplifying the explanation, a case is considered in which the second target engine power is calculated without using a variable rate limiter. It is assumed that the first target engine power is given by the dotted line in FIG. 9. In contrast, the second target engine power calculated by the vehicle body state managing unit 2-8 comes to be defined within the hatching range in FIG. 9 with a shape of having its upper and lower limit values.

When it is assumed that "optimum fuel efficiency torque line" that optimizes the fuel efficiency is defined in the range of the second target engine power of this hatching range, a target power correcting unit 2-5*c* calculates the power corresponding to the intersection point of the droop line and the optimum fuel efficiency torque line of the engine 1-1 in the rotational speed-torque characteristic diagram as the third target engine power.

Figure 9:
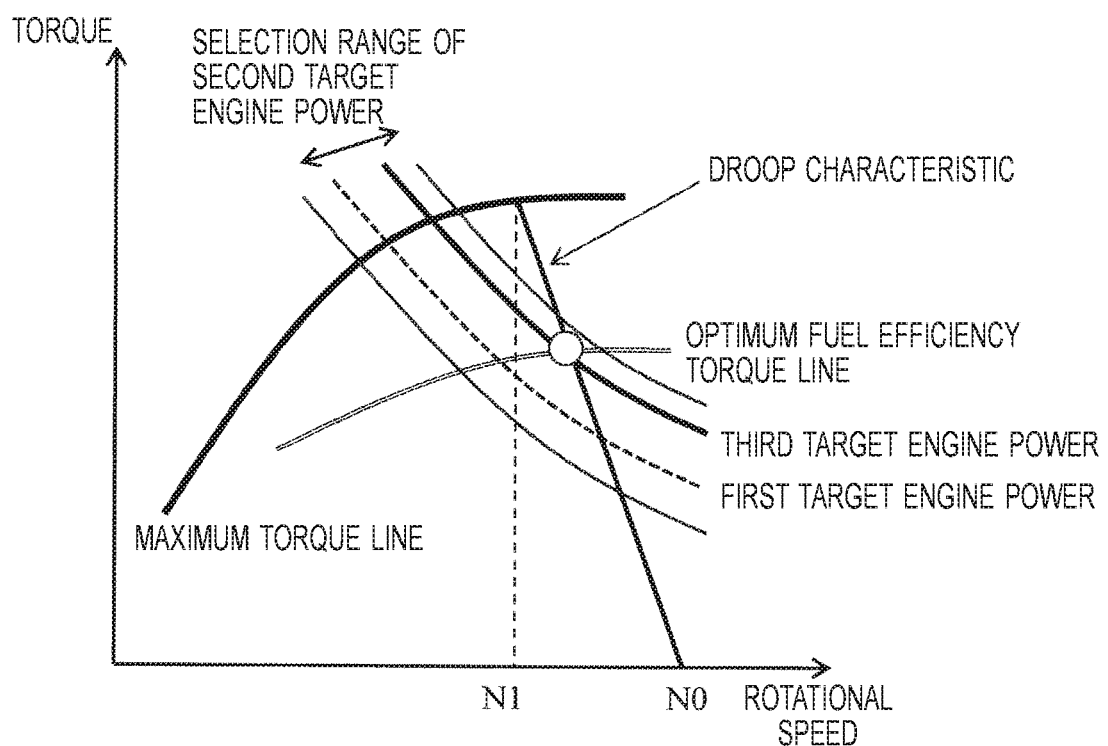
FIG. 9 is a drawing explaining the calculation contents of the target power correcting unit shown in FIG. 3.

In the example shown in FIG. 9, because the third target engine power which is the final output becomes higher than the first target engine power which is the original required power, the output of the engine becomes high. However, in addition to that the fuel consumption efficiency is higher when the third target engine power is selected, even if the engine 1-1 is kept at a high power purposely, the excess power is utilized for charging the electrical storage device 1-10 and the energy is not wasted, and therefore improvement of the fuel efficiency can be expected as the total operation. Also, when "optimum exhaust gas torque line" that minimizes the exhaust gas imposing a load on the environment is used instead of "optimum fuel efficiency torque line" of FIG. 9, it becomes possible also to suppress generation of the black smoke, NOx and the like.

Figure 15:
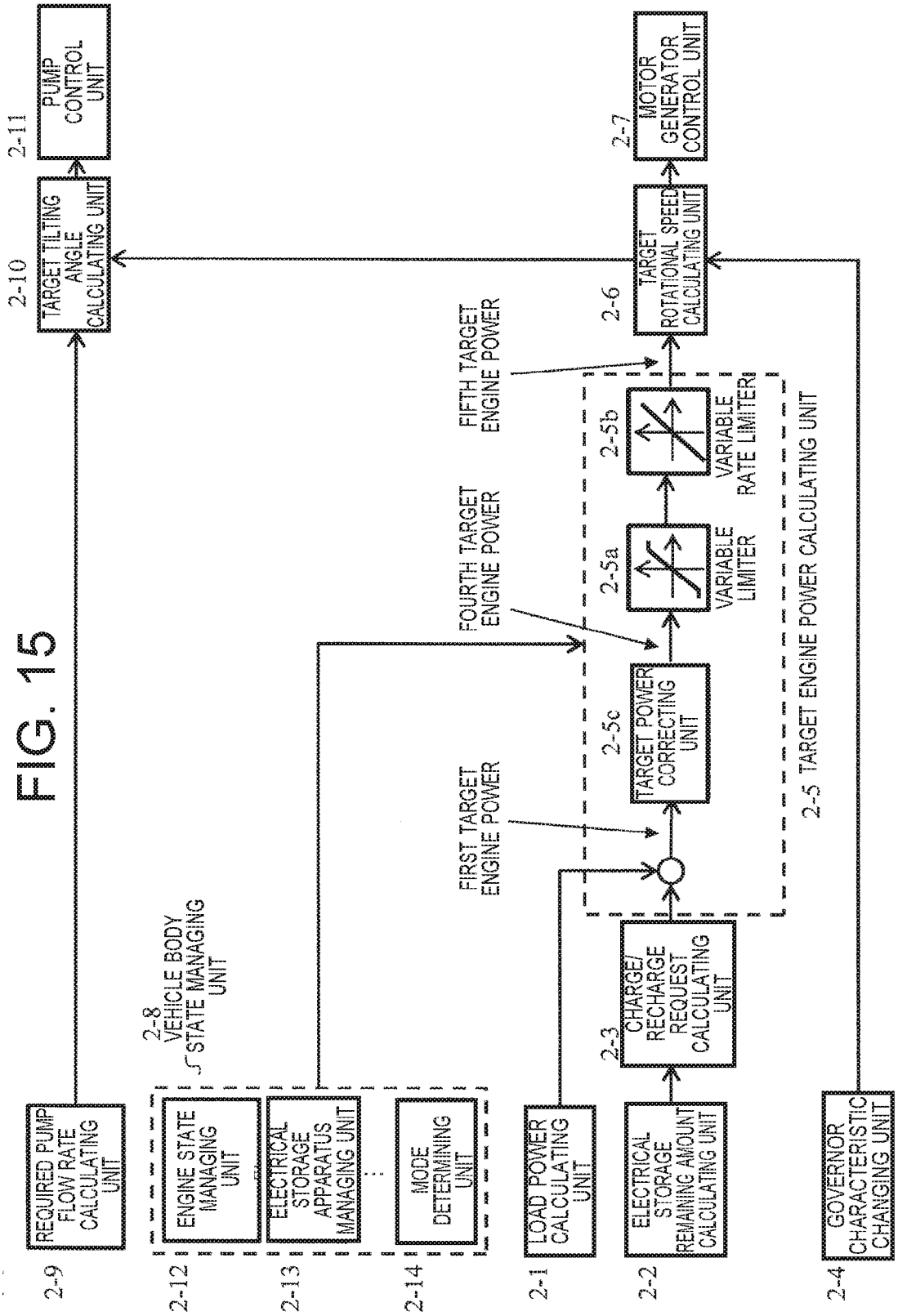
FIG. 15 is a drawing showing a modification example of the internal configuration of the controller shown in FIG. 2.
Figure 16A:
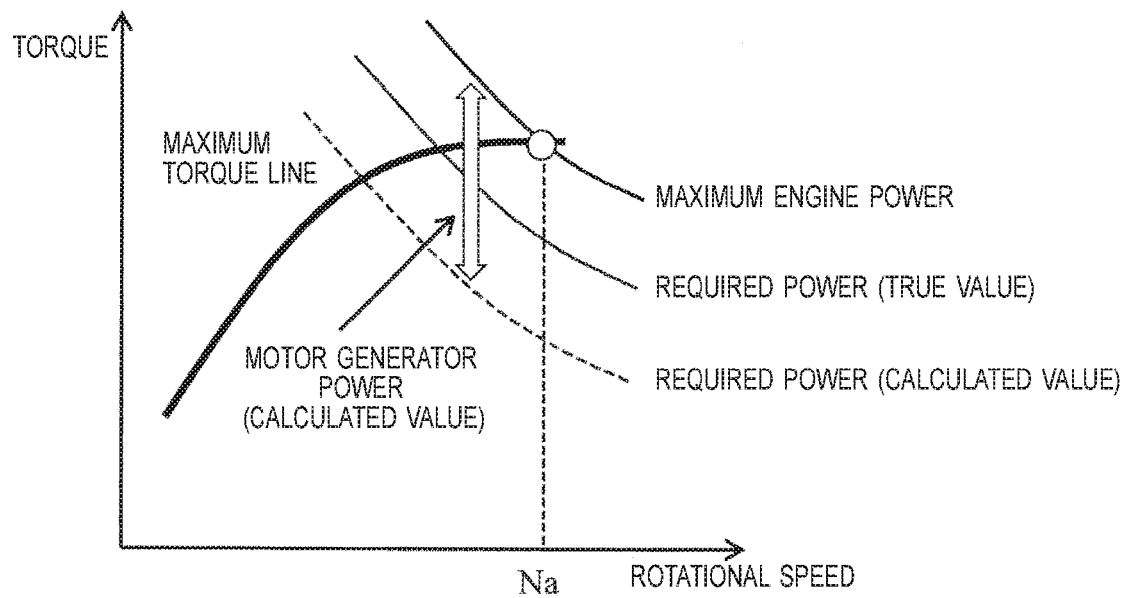
FIG. 16 is a drawing showing the control operation of an engine related to a prior art.
Figure 16B:
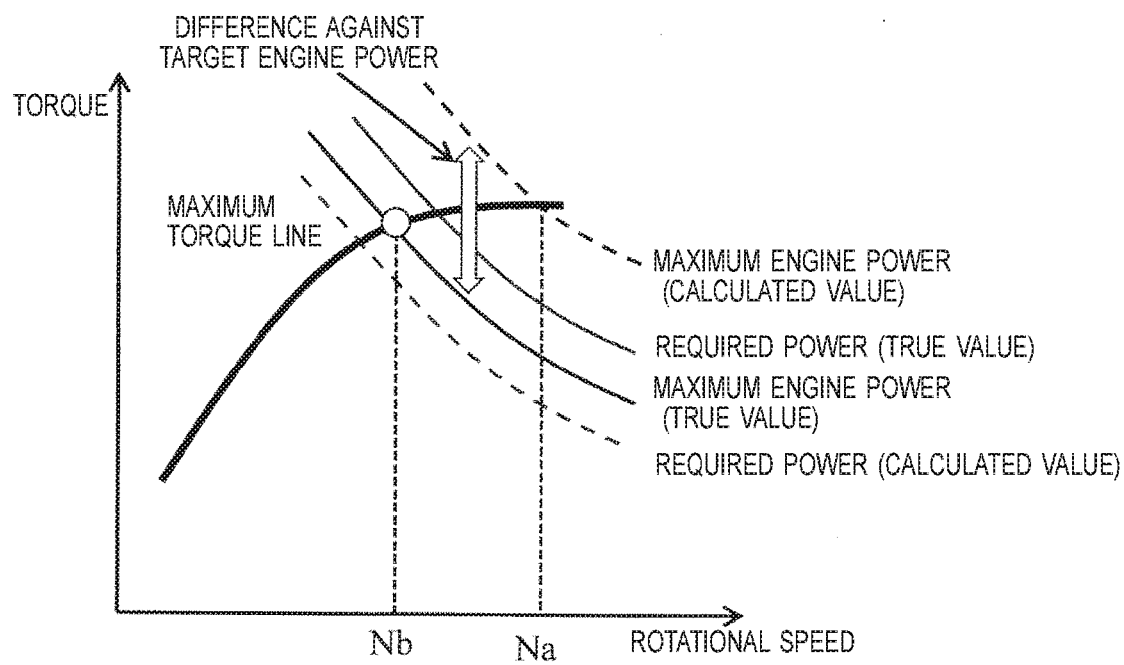

Although the final output of the target engine power calculating unit 2-5 is given by the third target engine power in the above explanation, the embodiment of the present invention is not limited to it, and the first target engine power or the second target engine power also may be utilized as the final output of the target engine power calculating unit 2-5. Also, the order of "variable limiter 2-5*a*-variable rate limiter 2-5*b*-target power correcting unit 2-5*c*" is not limited to that shown in FIG. 3, and such process of "target power correcting unit 2-5*c*-variable rate limiter 2-5*b*-variable limiter 2-5*a*", for example, which is the opposite order of FIG. 3 may be also employed. Further, for example, as shown in FIG. 15, it is also possible to employ the process of "target power correcting unit 2-5*c*-variable limiter 2-5*a*-variable rate limiter 2-5*b*" to calculate the fourth target engine power by the target power correcting unit 2-5*c* based on the first target engine power, to execute calculation in the order of the variable limiter 2-5*a* and the variable rate limiter 2-5*b*, and to output the fifth target engine power finally.

Figure 10:
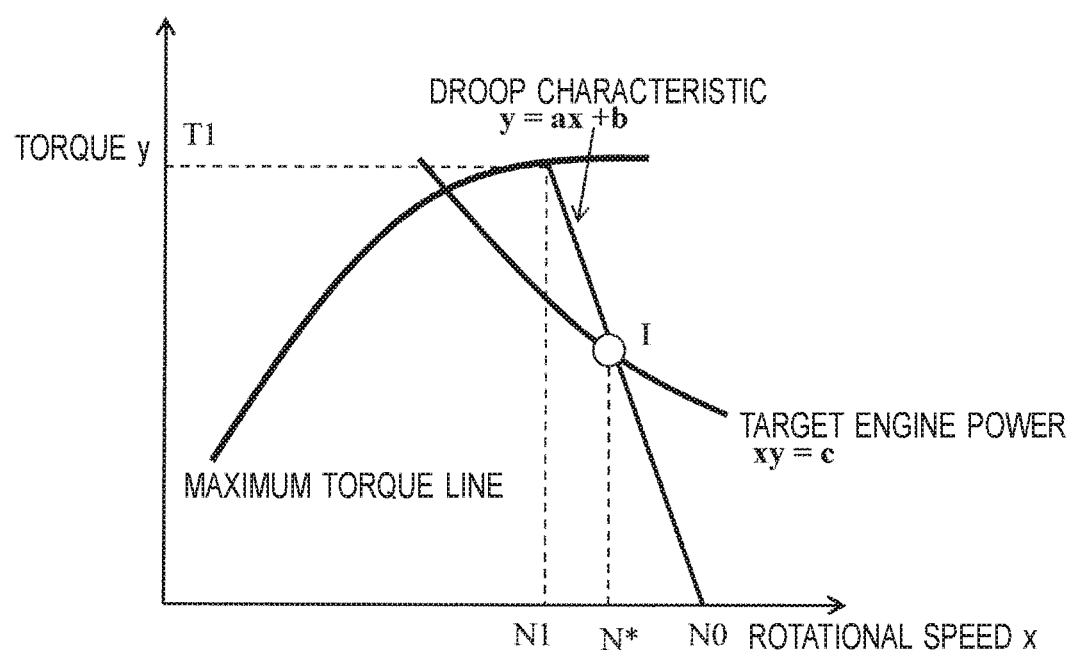
FIG. 10 is a drawing explaining the calculation contents of the target rotational speed calculating unit shown in FIG. 3.

A target rotational speed calculation unit 2-6 calculates the target rotational speed commnand for the motor generator control unit 2-7 that controls the rotational speed of the motor generator 1-2 based on the target engine power calculated by the target engine power calculating unit 2-5 and the droop characteristic determined by the governor characteristic changing unit 2-4. A concrete calculation method will be explained according to FIG. 10. As shown in FIG. 10, first, such droop characteristic that the rotational speed reduces to N1 as the load increases (the engine torque increases) from the no-load rotational speed N0 is determined by the governor characteristic changing unit 2-4. Also, the governor characteristic changing unit 2-4 can change the no-load rotational speed N0 corresponding to the engine control dial, for example.

Next, the equal power line of "target engine power" output by the target engine power calculating unit 2-5 described above is plotted on the rotational speed-torque characteristic diagram. Also, with respect to "target engine power" described above, any of the first-third target engine power may be selected as described above. The target rotational speed calculating unit 2-6 outputs the rotational speed N* of the intersection point I of above two lines in the rotational speed-torque characteristic diagram as the target rotational speed.

Here, the above calculation is not limited to the calculation method of using a map, and it is also possible to obtain the target rotational speed algebraically. A method for algebraically obtaining the target rotational speed with the engine torque being made y and the engine rotational speed being made x will be explained below. The droop characteristic is given by (Formula 1) shown below as a straight line passing two points of the rotational speed N0 corresponding to no-load T0 and the rotational speed N1 corresponding to the maximum load T1.

[Math 1]

$$Y = ax + b \qquad \text{(Formula 1)}$$

a and b of Formula 1 is given by (Formula 2) shown below as the solution of the simultaneous equations of (y, x)=(T0, N0) and (y, x)=(T1, N1)

[Math 2]

$$a = \frac{T1 - T0}{N1 - N0}, \quad b = \frac{T0N1 - T1N0}{N1 - N0} \qquad \text{(Formula 2)}$$

Next, when the target engine power is made c, the power equal line of FIG. 9 can be given by (Formula 3) shown below.

[Math 3]

$$xy = c \qquad \text{(Formula 3)}$$

It can be obtained as the solution with respect to x of the second order equation (Formula 4) which is led from (Formula 1) and (Formula 3) because N* is the intersection point of the droop characteristic and the equal power line.

[Math 4]

$$ax^2 + bx - c = 0 \qquad \text{(Formula 4)}$$

(Formula 4) can be easily solved according to quadratic formula, and its solution is as per (Formula 5) shown below.

[Math 5]

$$x = \frac{-b \pm \sqrt{b^2 + 4ac}}{2a} \qquad \text{(Formula 5)}$$

Out of (Formula 5), one satisfying N1<x<N0 becomes the target rotational speed N*. The target rotational speed N* is given by (Formula 6) shown below finally because N* is apparently the larger one out of x of (Formula 5) from FIG. 10. Also, a, b of (Formula 6) follow (Formula 2).

[Math 6]

$$N* = \frac{-b - \sqrt{b^2 + 4ac}}{2a} \qquad \text{(Formula 6)}$$

Returning to FIG. 3, a target tilting angle calculating unit 2-10 calculates the tilting angle command for the pump control unit 2-11 which controls the tilting angle of the hydraulic pump 1-3 based on the target rotational speed calculated by the target rotational speed calculating unit 2-6 and the required pump flow rate calculated by the required pump flow rate calculating unit 2-9. The required pump flow rate calculating unit 2-9 has a function of calculating, as the required pump flow rate, the discharge flow rate of the hydraulic pump 1-3 required for executing various works by the hybrid excavator according to the lever operation of the operator.

In the target tilting angle calculating unit 2-10, by dividing the required pump flow rate by the target rotational speed calculated by the target rotational speed calculating unit 2-6, the displacement volume of the hydraulic pump 1-3 capable of securing the required pump flow rate is obtained, and the command value of the tilting angle is calculated so that this displacement volume can be achieved. Also, the tilting angle command may be calculated utilizing the actual rotational speed instead of the target rotational speed. In this case, there is an advantage that it is not necessary to input the signal from the target rotational speed calculating unit 2-6 to the target tilting angle calculating unit 2-10.

Figure 11:
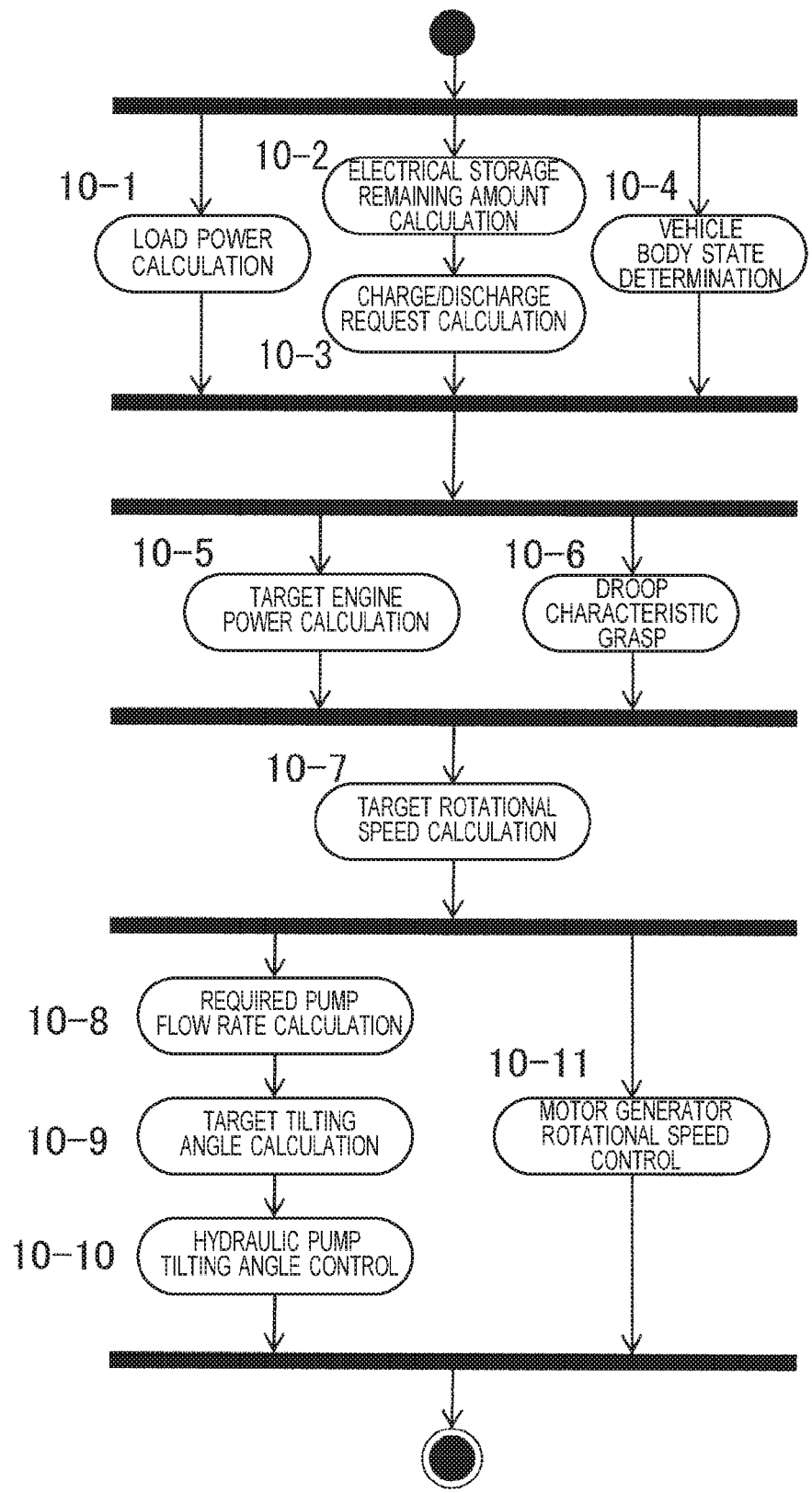
FIG. 11 is an activity diagram of the processing by the controller shown in FIG. 2.

Next, the calculation procedure of the controller 1-8 will be shown according to the activity diagram of FIG. 11. When the calculation is started, determination of various vehicle body states is executed first. To this, calculation of the function block disposed on the left side of FIG. 3 corresponds. To be more specific, the calculation content of the load power calculating unit 2-1 corresponds to a load calculation 10-1, the calculation content of the vehicle body state managing unit 2-8 corresponds to a vehicle body state determination 10-4, and the calculation contents of the electrical storage remaining amount calculating unit 2-2 and the charge/discharge request calculating unit 2-3 correspond to an electrical storage remaining amount calculation 10-2 and a charge/discharge request calculation 10-3, respectively.

Based on the above calculation result, the target power of the engine 1-1 is calculated utilizing the target engine power calculating unit 2-5. This is a target engine power calculation 10-5 in FIG. 11. Also, in parallel with the calculation of the target engine power, the droop characteristic determined by the governor characteristic changing unit 2-4 is grasped by a droop characteristic grasp 10-6.

Next, based on the above calculation result, the target rotational speed of the motor generator 1-2 is calculated by a target rotational speed calculation 10-7. For this calculation, the target rotational speed calculating unit 2-6 described above is utilized. After the target rotational speed is calculated, the control for transmitting the rotational speed command to the power generator control unit 2-7 by a motor generator rotational speed control 10-11 and the control for securing the pump flow rate by a required pump flow rate calculation 10-8, a target tilting angle calculation 10-9, and a hydraulic pump tilting angle control 10-10 are executed in parallel. The above calculations are executed at every calculation period (for example, at every 10 ms.) of the controller 1-8.

Figure 12:
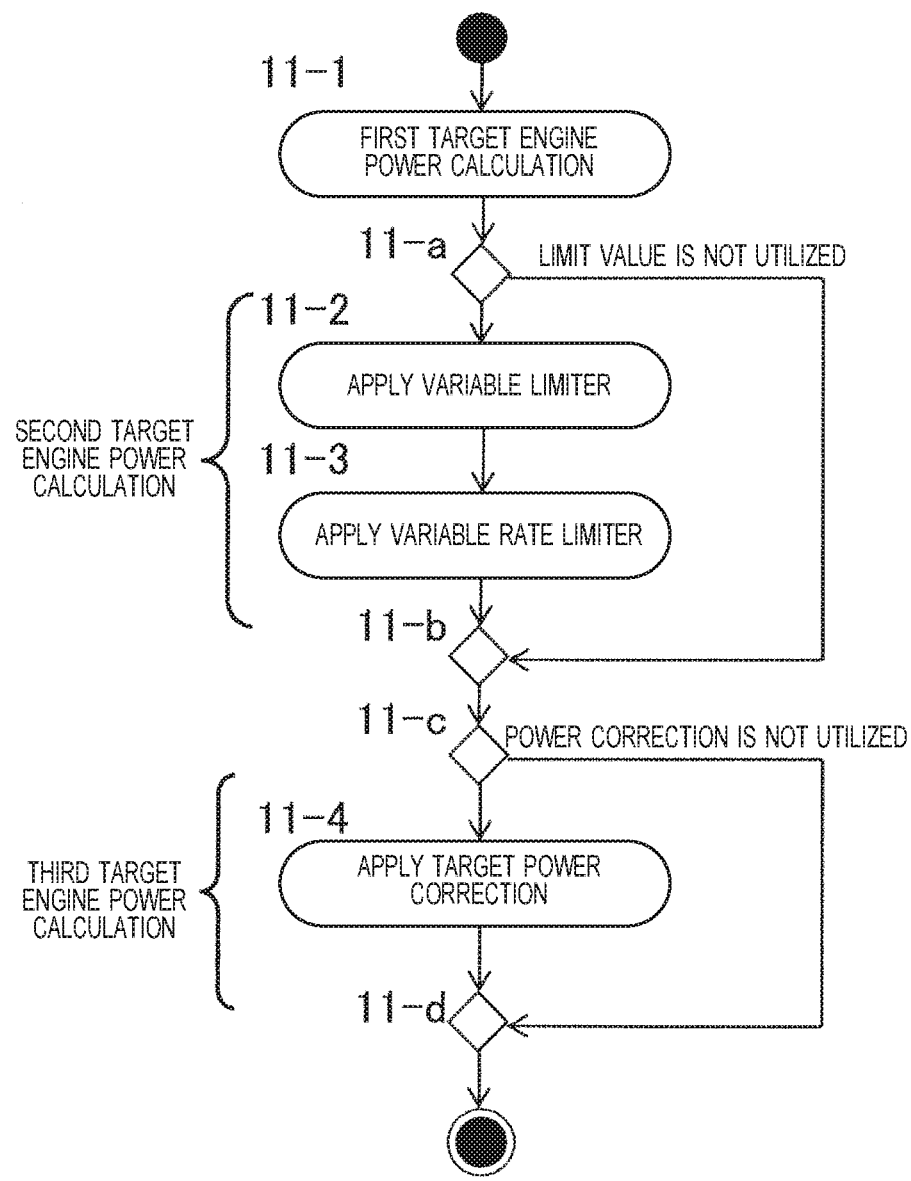
FIG. 12 is an activity diagram of the processing by the target engine power calculating unit shown in FIG. 3.

The detail of the above target engine power calculation 10-5 is shown in the activity diagram of FIG. 12. First, in a first target engine power calculation 11-1 block, the first target engine power is calculated according to the calculation result of the load power calculation 10-1 and the charge/discharge request calculation 10-3. At a branching 11-a, whether calculation of the second target engine power provided with a limitation value is executed is determined. When calculation of the second target engine power is not executed, the process shifts to a joining 11-b.

When the second target engine power is calculated, a variable limiter application 11-2 and a variable rate limiter application 11-3 are executed according to the disposition of the function block of FIG. 3. At a branching 11-c, whether calculation of the third target engine power utilizing the power correction is executed is determined. When calculation of the third target engine power is not executed, the process shifts to a joining 11-d. When calculation of the third target engine power is executed, a target power correction application 11-4 is executed by the target power correcting unit 2-5c described above. The result of the above calculation is calculated as the final target engine power, and becomes the output of the target engine power calculation 10-5 of FIG. 11.

Next, the control operation of the time the hybrid excavator related to the present embodiment continuously executes "excavating operation" will be explained. "Excavating operation" is an operation that the excavator scoops the gravel and soil and loads them to a dump truck, and is characterized that the hydraulic load sharply reduces after loading and discharging while a large hydraulic load is applied after the start of excavation until loading.

Figure 13:
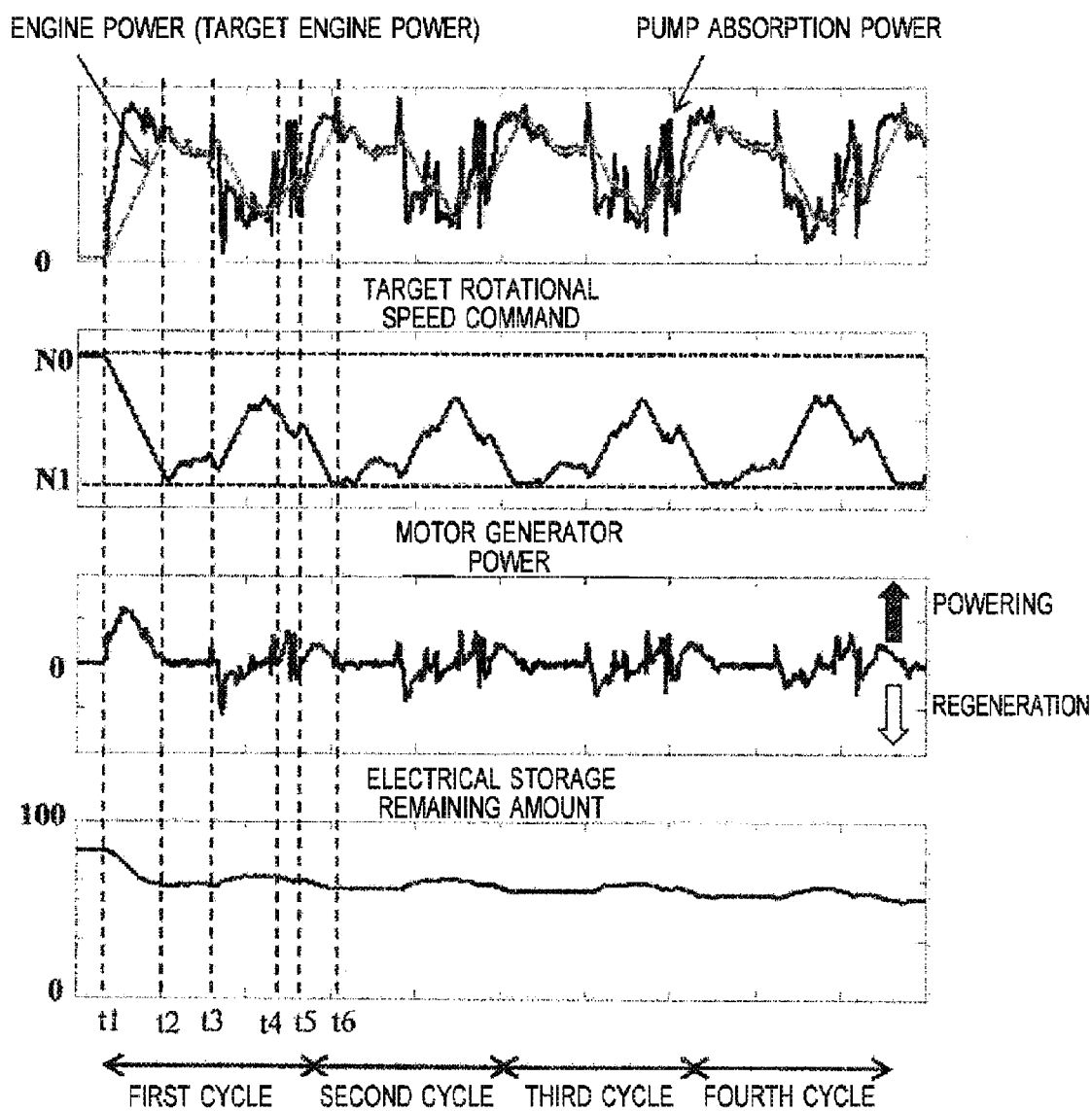
FIG. 13 is a time-series graph of the various power, the target rotational speed, and the electrical storage remaining amount of the hybrid excavator related to an embodiment of the present invention.
Figure 14A:
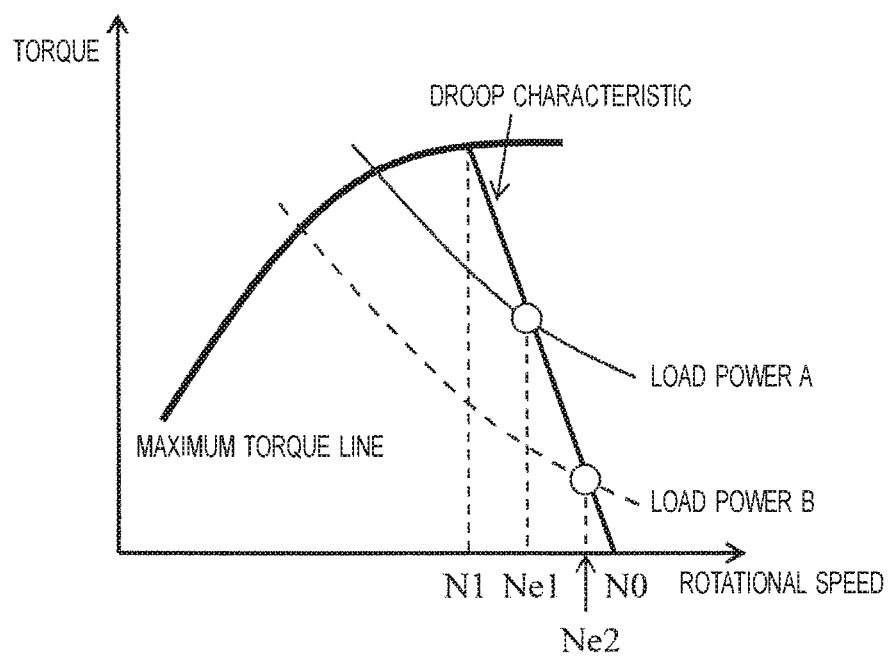
FIG. 14 is drawings showing the control operation by the engine having the droop characteristic and the motor generator driven by the rotational speed control.
Figure 14B:
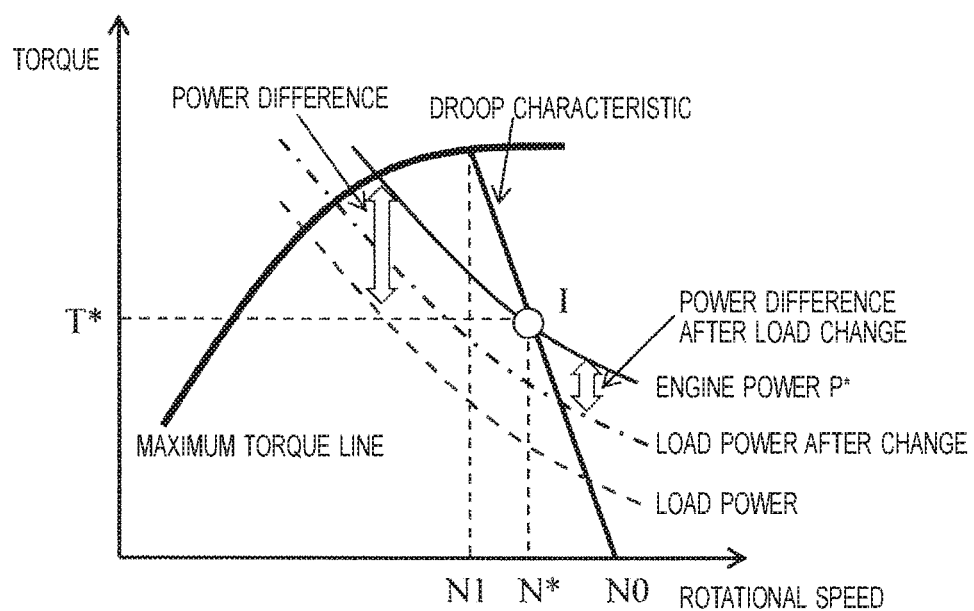

FIG. 13 shows the time-series waveform of the pump absorption power and the engine power (target engine power) in the first stage, the target rotational speed command value sent to the motor generator 1-2 in the second stage, the power of the motor generator 1-2 output for following the target rotational speed in the third stage, and the electrical storage remaining amount in the fourth stage. Also, with respect to the motor generator power of the third stage, the positive value expresses powering and the negative value expresses regeneration.

With respect to the time-series data of FIG. 13, in order to simplify the explanation, following conditions (1) to (3) were assumed.

(1) The situation determined by the vehicle body state managing unit 2-8 is always in a constant condition, namely the values of the variable limiter 2-5a and the variable rate limiter 2-5b utilized by the target engine power calculating unit 2-5 are made constant.

(2) The target power correcting unit 2-5c described above is not used, and the second target engine power is made the final output of the target engine power calculating unit 2-5.

(3) The governor characteristic is always made constant.

At the time t1, the excavating operation is started. At the time of the excavating operation, a combined operation of crowding the arm 16-4 or the bucket 16-5 while lifting the boom 16-3 is executed. Therefore, in order to feed a large amount of the pressure oil to the respective hydraulic cylinders 16-7 to 16-9, the pump absorption power sharply rises up. At this time, according to the present embodiment, the load power calculated by the load power calculating unit 2-1 sharply rises up responding to the pump absorption power. Thus, the first target engine power also changes sharply. By passing this first target engine power to the variable rate limiter 2-5b, the second target engine power in which the increase rate is limited is created.

Corresponding to the second target engine power, the target rotational speed command also reduces gradually. When the rotational speed change of the engine 1-1 is slow, increase of the engine power also becomes slow because the torque of the engine 1-1 follows the droop characteristic. At this time, the power the engine 1-1 can feed becomes short with respect to the pump absorption power. Then, as shown in the third stage, the motor generator 1-2 executes the power assist highly responsively so as to eliminate the slight rotation speed error generated by the power shortage.

The operation described above comes to last until the time t2 when the engine power agrees with the pump absorption power. Also, because the increase rate limited by the variable rate limiter 2-5b increases/decreases depending on the output of the vehicle body state managing unit 2-8, there is a case the engine power agrees with the pump absorption power at a time earlier or later than t2 shown in the drawing.

The time t2 to t3 corresponds to "rotating boom lifting" operation of rotating the revolving superstructure body 16-2 so that the position of the bucket 16-5 matches the load deck position of the dump truck while lifting the boom 16-3 in order to load the soil loaded into the bucket 16-5 to the load deck of the dump truck. Although the rotating boom lifting operation requires a large power, because the change of the pump absorption power is slow enough, the first target engine power does not receive the limitation of the variable limiter 2-5a and the variable rate limiter 2-5b during that time. Therefore, the output of the target engine power calculating unit 2-5 agrees with the pump absorption power. At this time, because the engine power and the pump absorption power are balanced with each other, the rotation speed error does not occur, and therefore the power of the motor generator 1-2 becomes 0.

The time t3 to t4 corresponds to "soil discharging" operation of loading the soil loaded into the bucket 16-5 to the load deck of the dump truck. Since the soil discharging operation does not require a large power other than the operation of the bucket 16-5, the pump absorption power sharply reduces from the time of the rotating boom lifting operation. At this time, according to the present embodiment, because the load power calculated by the load power calculating unit 2-1 sharply reduces responding to the pump absorption power, the first target engine power also changes sharply. However, because the reduction rate of the second target engine power is limited by the variable rate limiter 2-5b, the output of the target engine power calculating unit 2-5 gradually reduces as shown in FIG. 13. Responding to it, the target rotational speed command to the motor generator 1-2 gradually increases.

So as to prevent the sharp rise of the engine speed from the target rotational speed caused because of a high engine power relative to the pump absorption power, the electric power generation operation is automatically executed by the rotational speed control of the motor generator 1-2. Also, because the electricity generation operation is executed by the motor generator 1-2, the electrical storage remaining amount increases.

The time t4 to t5 is the operation called "returning", and the boom 16-3, the arm 16-4, the bucket 16-5, and the revolving superstructure 16-2 are operated compositely in order to return the claw tip of the bucket 16-5 which has been made empty by soil discharging to the excavation position. In this returning operation, because many actuators are operated, the pump absorption power sharply rises up again. The control operation of this time is similar to that of the time t1 to t2. However, because the engine power is reduced gradually during the time t3 to t4, the control can be started from the state of a high engine power, and therefore the assist amount by the motor generator 1-2 becomes small.

At the time t5, the first cycle of the excavation operation finishes, and a large pump absorption power similar to that of the time t1 is required again. Although the control operation of the time t5 to t6 is also similar to that of the time t1 to t2, because the control can be started from the state of a high engine power as the time t3 to t4, the assist amount by the motor generator 1-2 becomes small.

As shown in FIG. 13, it is known that the electrical storage remaining amount remains within a range centered at a constant value on and after the excavation operation of the second cycle. From this fact, it can be said that the excavation operation can be continued even in the cycle thereafter without applying a sharp load to the engine 1-1 by executing the engine assist by the motor generator 1-2.

As described above, according to the hybrid excavator related to the present embodiment, by employing the configuration of combining the engine 1-1 controlled by the droop characteristic and the motor generator 1-2 controlled according to the target rotational speed N*, the engine 1-1 can be operated with the target engine power, and the engine can be operated under a proper state. This leads to the stable combustion of the engine, and contributes also to improvement of the fuel efficiency and suppression of the exhaust gas. Further, according to the present embodiment, because the target engine power is obtained considering the charge/discharge request of the electrical storage apparatus 1-19, the electric power of the electrical storage apparatus 1-19 can be kept within a proper range. As a result, the engine stall caused by shortage of the electrical storage remaining amount of the electrical storage apparatus 1-19 and overcharging can be prevented.

As mentioned above, according to the present embodiment, because a limitation considering the state of the engine 1-1 and the electrical storage apparatus 1-19 is arranged in the calculation of the target engine power, it becomes possible also to achieve the protection of the engine 1-1 and the electrical storage apparatus 1-19. For example, when a heavy load is continuously applied to the engine 1-1, by calculating the second target engine power having a small upper limit value with respect to the first target engine power, it becomes possible to lower the engine power. Thus, overload and overheat of the engine 1-1 can be avoided.

Further, by calculating the second target engine power obtained by limiting the change rate and the upper and lower limit values of the first target power and executing control so that the engine power follows this second target engine power, the engine 1-1 comes to be operable with the operation state equivalent to the steady operation. Even in this state, because the combustion state of the engine 1-1 is stable with respect to the time of the transitional operation, the fuel efficiency is improved and generation of the exhaust gas that imposes a load on the environment is suppressed. Further, because the operation point of the engine 1-1 is stabilized, the noise caused by vibration and the like can be also suppressed.

Also, with respect to the state management of the electrical storage apparatus 1-19, by correcting the second target engine power to one closer to the load power so as to protect the electrical storage apparatus 1-19 considering the temperature of the electrical storage apparatus 1-19 and the accumulated value of the charge/discharge electric current and suppressing both of the powering and regeneration of the motor generator 1-2, protection of the electrical storage apparatus 1-19 becomes possible.

In addition, according to the present embodiment, because the target engine power is corrected so as to become such operation point where improvement of the fuel efficiency and suppression of the exhaust gas are possible considering the characteristic of the engine 1-1, improvement of the fuel efficiency and suppression of the exhaust gas improve further.

Further, by calculating the fifth target engine power obtained by limiting the change rate and the upper and lower limit values of the fourth target power and executing control so that the engine power follows this fifth target engine power, the engine 1-1 comes to be operable with the operation state equivalent to the steady operation. Even in this state, because the combustion state of the engine 1-1 is stable with respect to the time of the transitional operation, the fuel efficiency is improved and generation of the exhaust gas that imposes a load on the environment is suppressed. Further, because the operation point of the engine 1-1 is stabilized, the noise caused by vibration and the like can be also suppressed.

Further, with respect to the state management of the electrical storage apparatus 1-19, by correcting the fifth target engine power to one closer to the load power so as to protect the electrical storage apparatus 1-19 considering the temperature of the electrical storage apparatus 1-19 and the accumulated value of the charge/discharge electric current and suppressing both of the powering and regeneration of the motor generator 1-2, protection of the electrical storage apparatus 1-19 becomes possible.

Also, in the present embodiment, because the engine 1-1 is controlled with the droop characteristic, the load torque of the engine 1-1 increases by lowering the engine speed. By regeneration control of the motor generator 1-2 by the increment of the load torque, the regenerated electric power from the motor generator 1-2 can be charged to the electrical storage apparatus 1-19. Thus, according to the present embodiment, only by controlling the engine speed, charging of the electrical storage apparatus 1-19 can be executed effectively. In addition, because only the engine speed is controlled, the engine operation is stable even during charging of the electrical storage apparatus 1-19. Also, "the load power on the engine shaft is equal" in the present invention includes both of the case the load power is equal during operation of the boom 16-3, the arm 16-4, and the bucket 16-5, and the case the load power is equal when the boom 16-3, the arm 16-4, and the bucket 16-5 are not operated (during no-operation) in the present embodiment.

Further, according to the present embodiment, since the target tilting angle of the hydraulic pump 1-3 is calculated according to the pump flow rate required for the hydraulic pump 1-3 and the target rotational speed command value for the motor generator 1-2, even when the rotational speed of the hydraulic pump 1-3 is changed in controlling the motor generator 1-2, the discharge flow rate of the hydraulic pump 1-3 can be kept as per the requirement. Therefore, even when the engine speed is changed according to the droop characteristic, the operability of the hybrid excavator is not spoiled.

Although the embodiments described above are suitable to implementation of the present invention, its implementation form is not limited to them, and various modifications are possible within the scope not changing the substance of the present invention. For example, the hybrid construction machinery related to the present invention may be applied to construction machinery other than the hydraulic excavator such as a wheel loader.

REFERENCE SIGNS LIST

1-1 Engine
1-2 Motor generator
1-3 Hydraulic pump
1-8 Controller
1-19 Electrical storage apparatus
2-1 Load power calculating unit
2-2 Electrical storage remaining amount calculating unit
2-3 Charge/discharge request calculating unit
2-4 Governor characteristic changing unit
2-5 Target engine power calculating unit
2-6 Target rotational speed calculating unit
2-7 Motor generator control unit
2-9 Required pump flow rate calculating unit
2-10 Target tilting angle calculating unit
2-11 Pump control unit
2-12 Engine state managing unit
2-13 Electrical storage apparatus managing unit
16-3 Boom (hydraulic working unit)

16-4 Arm (hydraulic working unit)
16-5 Bucket (hydraulic working unit)
I Intersection point
N* Target rotational speed command value

The invention claimed is:

1. Hybrid construction machinery, comprising:
an engine (1-1);
a hydraulic pump (1-3) that is driven by the engine (1-1);
a hydraulic working unit (16-3, 4, 5) that is driven by pressure oil discharged from the hydraulic pump (1-3);
a motor generator (1-2) that transmits torque between the engine (1-1);
an electrical storage apparatus (1-19) that feeds electric power to the motor generator (1-2); and
a controller (1-8) that controls the engine (1-1) with a governor characteristic in which the relation between load torque and rotational speed has such predetermined inclination that the rotational speed reduces as the load torque increases,
wherein the controller (1-8) includes:
a governor characteristic changing unit (2-4) that changes setting of the governor characteristic;
a load power calculating unit (2-1) that calculates load power on an engine shaft;
an electrical storage remaining amount calculating unit (2-2) that calculates a remaining amount of the electrical storage apparatus (1-19);
a charge/discharge request calculating unit (2-3) that calculates a charge/discharge request required for keeping electric power of the electrical storage apparatus (1-19) in a proper range based on an output of the electrical storage remaining amount calculating unit (2-2);
a target engine power calculating unit (2-5) that calculates target power of the engine (1-1);
a target rotational speed calculating unit (2-6) that calculates a target rotational speed command of the motor generator (1-2); and
a motor generator control unit (2-7) that controls the motor generator (1-2) according to a target rotational speed command value calculated by the target rotational speed calculating unit (2-6),
wherein the target engine power calculating unit (2-5) calculates first target engine power that increases and decreases according to increase and decrease of an output value from the load power calculating unit (2-1) and the charge/discharge request calculating unit (2-3),
and wherein the target rotational speed calculating unit (2-6) calculates rotational speed of an intersection point of a governor characteristic line changed by the governor characteristic changing unit (2-4) and an equal power line dependent on the first target engine power on a rotational speed-torque characteristic diagram as a target rotational speed command value of the motor generator (1-2).

2. The hybrid construction machinery according to claim 1,
wherein the controller (1-8) further comprises:
an engine state managing unit (2-12) that manages the operation state of the engine (1-1); and
an electrical storage apparatus managing unit (2-13) that manages the operation state of the electrical storage apparatus (1-19),
wherein the target engine power calculating unit (2-5) calculates a second target engine power in which a limitation is arranged in the change rate and the upper and lower limit values of the first target engine power based on an output of the engine state managing unit (2-12) and the electrical storage apparatus managing unit (2-13),
and wherein the target rotational speed calculating unit (2-6) calculates the rotational speed of the intersection point of a governor characteristic line changed by the governor characteristic changing unit (2-4) and an equal power line dependent on the second target engine power on a rotational speed-torque characteristic diagram as a target rotational speed command value of the motor generator (1-2).

3. The hybrid construction machinery according to claim 2,
wherein the target engine power calculating unit (2-5) calculates a third target engine power in which the characteristic of at least the fuel efficiency or the exhaust gas is improved from the second target engine power,
and wherein the target rotational speed calculating unit (2-6) calculates the rotational speed of the intersection point of a governor characteristic line changed by the governor characteristic changing unit (2-4) and an equal power line dependent on the third target engine power on a rotational speed-torque characteristic diagram as a target rotational speed command value of the motor generator (1-2).

4. The hybrid construction machinery according to claim 1,
wherein the target engine power calculating unit (2-5) calculates a fourth target engine power in which the characteristic of at least the fuel efficiency or the exhaust gas is improved from the first target engine power, and
wherein the target rotational speed calculating unit (2-6) calculates the rotational speed of the intersection point of a governor characteristic line changed by the governor characteristic changing unit (2-4) and an equal power line dependent on the fourth target engine power on a rotational speed-torque characteristic diagram as a target rotational speed command value of the motor generator (1-2).

5. The hybrid construction machinery according to claim 4,
wherein the controller (1-8) further comprises:
an engine state managing unit (2-12) that manages the operation state of the engine (1-1); and
an electrical storage apparatus managing unit (2-13) that manages the operation state of the electrical storage apparatus (1-19),
wherein the target engine power calculating unit (2-5) calculates a fifth target engine power in which a limitation is arranged in the change rate and the upper and lower limit values of the fourth target engine power based on an output of the engine state managing unit (2-12) and the electrical storage apparatus managing unit (2-13), and
wherein the target rotational speed calculating unit (2-6) calculates the rotational speed of the intersection point of a governor characteristic line changed by the governor characteristic changing unit (2-4) and an equal power line dependent on the fifth target engine power on a rotational speed-torque characteristic diagram as a target rotational speed command value of the motor generator (1-2).

6. The hybrid construction machinery according to claim 1, wherein the controller (1-8) executes control so as to lower the rotational speed of the engine (1-1) from the target rotational speed command value and charges the electrical storage apparatus (1-19) when the remaining amount of the electrical storage apparatus (1-19) is less even when the load power on the engine shaft is equal, and to return the rotational speed of the engine (1-1) to the target rotational speed command value as charging is executed to the electrical storage apparatus (1-19).

7. The hybrid construction machinery according to claim 1, wherein a variable displacement type is used as the hydraulic pump (1-3), and wherein the controller (1-8) further comprises:

a required pump flow rate calculating unit (2-9) that calculates the pump flow rate required for the hydraulic pump (1-3);

a target tilting angle calculating unit (2-10) that calculates the target tilting angle of the hydraulic pump (1-3) from a pump flow rate calculated by the required pump flow rate calculating unit (2-9) and a target rotational speed command value for the motor generator (1-2); and a pump control unit (2-11) that controls the hydraulic pump so that the target tilting angle calculated by the target tilting angle calculating unit (2-10) and the tilting angle of the hydraulic pump agree with each other.

* * * * *